United States Patent
Shiimoto et al.

(10) Patent No.: US 9,245,548 B2
(45) Date of Patent: Jan. 26, 2016

(54) MAGNETIC HEAD USING A SYNTHETIC FERRI FREE STRUCTURE

(75) Inventors: Masato Shiimoto, Kanagawa (JP); Hiroyuki Katada, Kanagawa (JP); Kazuhiro Nakamoto, Kanagawa (JP); Hiroyuki Hoshiya, Kanagawa (JP)

(73) Assignee: HGST Netherlands B.V., Amsterdam (NL)

( * ) Notice: Subject to any disclaimer, the term of this patent is extended or adjusted under 35 U.S.C. 154(b) by 2498 days.

(21) Appl. No.: 12/011,334

(22) Filed: Jan. 25, 2008

(65) Prior Publication Data
US 2008/0182133 A1 Jul. 31, 2008

(30) Foreign Application Priority Data

Jan. 26, 2007 (JP) .................................. 2007-017041

(51) Int. Cl.
*G11B 5/39* (2006.01)
*B82Y 10/00* (2011.01)
*B82Y 25/00* (2011.01)

(52) U.S. Cl.
CPC ............... *G11B 5/3906* (2013.01); *B82Y 10/00* (2013.01); *B82Y 25/00* (2013.01); *G11B 2005/3996* (2013.01); *Y10T 428/1121* (2013.01)

(58) Field of Classification Search
None
See application file for complete search history.

(56) References Cited

U.S. PATENT DOCUMENTS

| | | | |
|---|---|---|---|
| 6,538,858 B1 | 3/2003 | Hasegawa et al. | |
| 6,947,263 B2 | 9/2005 | Saito | |
| 7,800,868 B2 * | 9/2010 | Gao et al. | 360/324.12 |
| 2002/0191348 A1 * | 12/2002 | Hasegawa et al. | 360/314 |
| 2004/0228045 A1 | 11/2004 | Hasegawa et al. | |
| 2006/0187591 A1 * | 8/2006 | Gill et al. | 360/324.12 |

FOREIGN PATENT DOCUMENTS

| | | |
|---|---|---|
| JP | 2002/163810 A2 | 6/2002 |
| JP | 2003/086861 A2 | 3/2003 |
| JP | 2003/249700 A2 | 9/2003 |

OTHER PUBLICATIONS

Klaassen et al. "Broad-band Noise Spectroscopy of Giant Magnetoresistive Read Heads," IEEE Transactions on Magnetics 41:2307-2317 (2005).
Chinese Office Action from application No. 2007-017041 dated Sep. 22, 2010 (no translation).
Japanese Office Action from application No. 2007-017041 dated Sep. 22, 2010 (no translation).

* cited by examiner

*Primary Examiner* — David D Davis
(74) *Attorney, Agent, or Firm* — Zilka-Kotab, PC

(57) ABSTRACT

Embodiments of the present invention help to reduce magnoise in a magnetoresistive head without deterioration in reproduced output and improve the signal/noise ratio (SNR) of the magnetoresistive head. According to one embodiment, the magnetoresistive head uses a synthetic ferri free layer and it is arranged such that the magnetic field which is applied to an end of a free layer with smaller film thickness and saturation magnetization in the track width direction by a coupling field is larger than the magnetic field which is applied to it by a bias layer.

20 Claims, 16 Drawing Sheets

MAGNETIC HEAD USING A SYNTHETIC FERRI FREE STRUCTURE

CROSS-REFERENCE TO RELATED APPLICATION

The instant nonprovisional patent application claims priority to Japanese Patent Application No. 2007-017041 filed Jan. 26, 2007 and which is incorporated by reference in its entirety herein for all purposes.

BACKGROUND OF THE INVENTION

A magnetoresistive head is used as a read sensor in high recording density magnetic recording technology focusing on hard disk drives and largely influences magnetic recording technological performance. In recent years, it has been well known that the magnetoresistance effect of a multilayered film in which ferromagnetic metal layers are stacked through a nonmagnetic metal layer, the so-called giant magnetoresistance (GMR) effect, is large. In this case, electric resistance changes depending on relative angle of magnetizations of two ferromagnetic layers with a nonmagnetic interlayer. For the use of this giant magnetoresistance effect in magnetoresistive sensors, a structure called a "spin valve" has been proposed. The spin valve includes a structure comprised of an anti-ferromagnetic layer, a ferromagnetic layer, a nonmagnetic interlayer and a ferromagnetic layer where a exchange coupling field generated in the interface between the anti-ferromagnetic layer and ferromagnetic layer substantially pins magnetization of the ferromagnetic layer in contact with the anti-ferromagnetic layer and magnetization of the other ferromagnetic layer is freely turned by an external magnetic field to obtain output. Hereinafter the ferromagnetic layer the above magnetization of which is substantially pinned by the anti-ferromagnetic layer is called first pinned layer and the ferromagnetic layer the above magnetization of which is turned by an external magnetic field is called free layer. The abovementioned basic structure is common to various types of GMR currently in practical use, more specifically CIP-GMR, tunneling magnetoresistive sensors (TMR) and current-perpendicular-to-the-plane GMR (CPP-GMR).

The aforementioned magnetoresistive sensors are structures developed to improve SNR (signal/noise ratio) of the magnetic head. For improvement of SNR of the magnetic head, it is necessary to increase the signal and reduce the noise. Magnetic noise such as Barkhausen noise and electric noise such as Johnson noise and shot noise are known as magnetic head noise. Barkhausen noise occurs because magnetization of free layer has a magnetic domain. Barkhausen noise can be controlled by providing bias layers at both sides of the multilayered film of the magnetic head in the track width direction. On the other hand, electric noise mainly depends on resistance. Therefore, in order to improve SNR of the magnetic head, efforts have been pursued toward magnetic domain control to suppress generation of magnetic domains, etc, and toward higher power output, typically by decrease of magnetic film resistance and development of new magnetic film such as TMR.

BRIEF SUMMARY OF THE INVENTION

Embodiments of the present invention help to reduce mag-noise in a magnetoresistive head without deterioration in reproduced output and improve the SNR of the magnetoresistive head. According to the particular embodiment of FIG. 1, the magnetoresistive head uses a synthetic ferri free layer and is arranged such that the magnetic field which is applied to an end of a free layer 1 with smaller film thickness and saturation magnetization in the track width direction by a coupling field, is larger than the magnetic field which is applied to it by a bias layer 21.

DETAILED DESCRIPTION OF THE INVENTION

Figure 1:
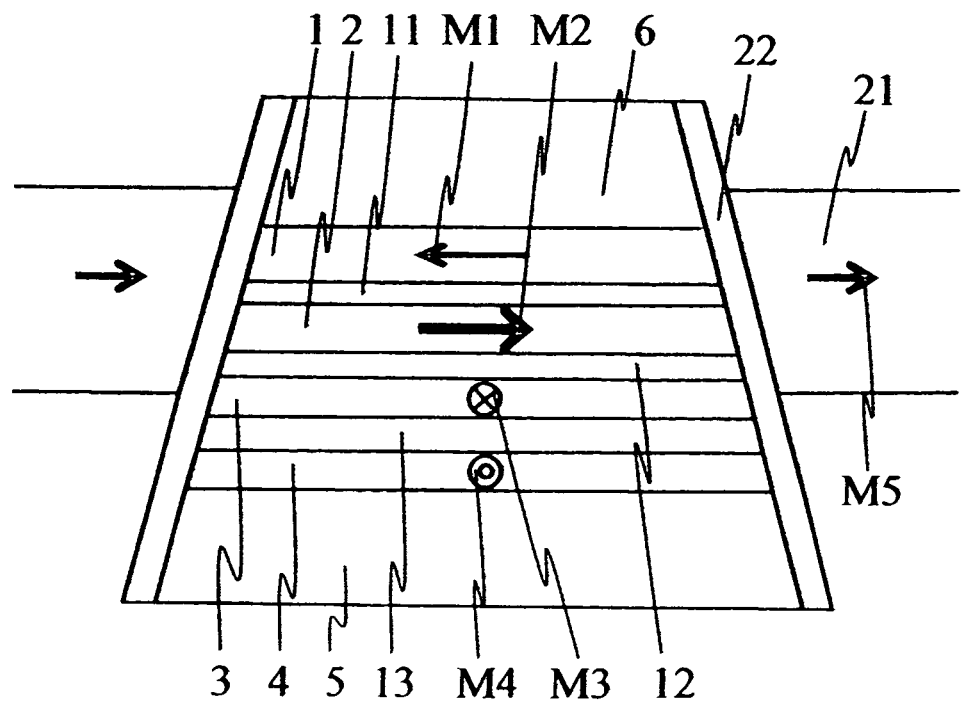
FIG. 1 is a view showing a structural example of a magnetoresistive head according to an embodiment of the present invention.

Embodiments of the present invention relate to a magnetic head for use in a magnetic recording system and more particularly to a magnetoresistive head for a high recording density magnetic recording system.

Recently it has been discussed that in addition to the above noises, there is noise (mag-noise) which occurs due to thermal fluctuation in magnetization of free layer. Theoretically, mag-noise ($N_{mag}$) can be calculated from the following formula (K. B. Klaassen, X. Xing and J. C. L. Peppen: IEEE Trans. Magn., 41.2307 (2005)).

Formula 1

$$N_{mag} = \frac{\Delta R}{H_{stiff}} \sqrt{\frac{4k_B T \alpha}{\mu_0 M_s V \gamma}} \quad (1)$$

Here, Δ denotes maximum saturation-to-saturation sensor resistance change of the magnetic sensor; $H_{stiff}$ denotes effective stiffness field to which the magnetic sensor is exposed; $K_B$ denotes Boltzman constant (=1.38×10⁻²³ J/K); T denotes sensor temperature; α denotes Gilbert damping constant; $\mu_0$ denotes vacuum magnetic permeability; Ms denotes saturation magnetization of free layer; V denotes the volume of free layer; and γ(=2.78×10³ m/As) denotes gyromagnetic constant. The feature of this mag-noise is that it is proportional to reproduced output and inversely proportional to the square root of the volume of free layer. In order to increase the recording density of the hard disk drive, the magnetic sensor should be very small, namely the volume of free layer must be decreased. This means that as the recording density increases, inherently mag-noise becomes larger.

In order to consider how mag-noise influences the signal/head-amp noise ratio (SNR), the relation between SNR and output (MR ratio) is discussed below. If there exists only previously known noise as magnetic head noise, head-amp SNR will continue to increase with output. This is because noise does not depend on output. For this reason, it has been thought that increase of output is effective for head-amp SNR improvement. However, the present inventors have newly found by newly calculating head-amp SNR which takes mag-noise into consideration, that head-amp SNR does not improve beyond a certain level even when the MR ratio increases. This suggests that in the future, a satisfactory head-amp SNR will not be achieved even by improvement of reproduced output if the magnetic sensor is very small and mag-noise increases. In other words, in order to obtain a satisfactory head-amp SNR, it is necessary to reduce mag-noise without deterioration in reproduced output. Also, along with mag-noise reduction, noise such as Barkhausen noise must be suppressed. this is because noise is the square root of the sum of squares of mag-noise and other electric or magnetic noise. In other words, it is necessary to satisfy a structure which reduces mag-noise without deterioration in reproduced output and an adequate magnetic domain control/bias layer structure which suppresses Barkhausen noise, etc., at the same time.

An object of embodiments of the present invention is to reduce mag-noise without deterioration in reproduced output of a magnetoresistive head and improve SNR for the magnetoresistive head.

In order to decrease the size of a magnetoresistive sensor in a magnetoresistive head and solve the problem of deterioration in head-amp SNR due to increased mag-noise caused by increased reproduced output and achieve high recording density, embodiments of the present invention employs the following approach.

For a magnetoresistive head, a spin valve type magnetoresistive sensor which has a multilayered structure with an anti-ferromagnetic layer, a ferromagnetic pinned layer, a non-magnetic interlayer and a ferromagnetic free layer is used. Here, the anti-ferromagnetic film, which applies exchange coupling bias to substantially pin magnetization of the ferromagnetic pinned layer, may be formed directly by adhesion to the ferromagnetic pinned layer or made effective indirectly through magnetic coupling. Alternatively, instead of the anti-ferromagnetic film, other biasing means such as remanent magnetization of hard magnetic material layer or current bias may be used. The ferromagnetic pinned layer may be a synthetic ferri pinned layer in which the first pinned layer and the second pinned layer are coupled through an anti-parallel coupling layer in a way that their magnetizations are anti-parallel. In this case, this coupling should be large enough for the magnetic field to be sensed. Concretely the magnitude of an anti-parallel coupling magnetic field is in the range of hundreds to thousands of Oe. Consequently the magnetization of the second pinned layer is pinned for the magnetic field to be sensed. The ferromagnetic free layer changes the direction of magnetization according to the magnetic field to be sensed. Output is generated by the relative angle between magnetization of ferromagnetic free layer the direction of which changes according to the magnetic field to be sensed and magnetization of ferromagnetic pinned layer or second pinned layer pinned for the magnetic filed to be sensed. In addition, a bias layer is provided in order to make the ferromagnetic free layer a single magnetic domain layer. Preferably this bias layer should be a high magnetic coercivity film with a magnetic coercivity large enough for the magnetic field to be sensed which is located at an end of the ferromagnetic free layer in the track width direction in a way that their ends are close to each other.

For such magnetoresistive head, embodiments of the present invention adopt the structure explained below.

The ferromagnetic free layer is a synthetic ferri free structure having two ferromagnetic layers which are magnetically anti-parallelly coupled through a free layer anti-parallel coupling layer. Of the two ferromagnetic free layers, the ferromagnetic free layer which is smaller in the product of magnetization and film thickness is called first ferromagnetic layer and the ferromagnetic free layer which is larger in the product of magnetization and film thickness is called second ferromagnetic layer. In this case, a magnetic field applied to the first ferromagnetic layer by exchange coupling through the free layer anti-parallel coupling layer should be larger than the magnetic field applied from the bias layer to an end of the first ferromagnetic layer in the track width direction. If the first ferromagnetic layer has shape magnetic anisotropy field, the magnetic field applied to the first ferromagnetic layer by exchange coupling through the free layer anti-parallel coupling layer should be larger than the sum of a bias field applied from the bias layer to an end of the first ferromagnetic layer in track width direction and track width direction component of the shape magnetic anisotropy field of the first ferromagnetic layer.

More specifically, it is structured as follows.

(1) The center of an end of the bias layer adjacent to the ferromagnetic free layer is nearer to the second ferromagnetic layer than to the first ferromagnetic layer.

(2) When the free layer anti-parallel coupling layer is made of Ru with a film thickness of 0.70 nm or more and 0.85 nm or less and the first ferromagnetic layer's film thickness is expressed by $t_f$(nm) and the ratio of the bias layer's film thickness and the nonmagnetic material's thickness (bias layer film thickness/nonmagnetic material thickness) is expressed by $t_r$, $t_r$ is 0.5 or more and 100 or less and $t_r$ and $t_f$ satisfy the following relation:

$$t_f < 3.9 \times t_r^{-0.38}$$

(3) When the free layer anti-parallel coupling layer is made of Ru with a film thickness of 0.35 nm or more and 0.45 nm or less and the first ferromagnetic layer's film thickness is expressed by $t_f$(nm) and the ratio of the bias layer's film thickness and the nonmagnetic material's thickness (bias layer film thickness/nonmagnetic material thickness) is expressed by $t_r$; $t_r$ is 0.5 or more and 100 or less and $t_r$ and $t_f$ satisfy the following relation:

$$t_f < 8.6 \times t_r^{-0.38}$$

According to embodiments of the present invention, Barkhausen noise due to a magnetic domain of free layer can be suppressed without deterioration in reproduced output and mag-noise can be reduced so that head SNR can be improved and high recording density can be achieved.

Thin film which constitutes giant magnetoresistive (GMR) multilayered film according to embodiments of the present invention was produced by a DC magnet-sputtering system as follows. The following materials were stacked over a ceramic substrate successively in an atmosphere of argon 1-6 mTorr (0.1-0.8 pascal). As a sputtering target, tantalum, nickel-20 at % iron alloy, Cu, Co—Fe, MnPt, Ru, alumina, MnIr or MnIrCr was used. For the multilayered film, high frequency electric power is supplied to cathodes where the targets were placed, so as to generate plasma in the system and the shutters on the cathodes were opened and closed one by one to form layers successively. During film formation, uniaxial anisotropy was attained by applying a magnetic field of about 80 Oe (6.4 kA/m) parallel to the substrate using a permanent magnet. The film thus formed was heat-treated in vacuum in a magnetic field at 270° C. for three hours to magnetize the exchange coupling field of MnPt, MnIr or MnIrCr anti-ferromagnetic film and the magneto resistance was measured at room temperature and evaluated. A sensor was formed on the substrate by patterning through a photoresist process. After that, the substrate was processed into a slider and mounted in a magnetic recording system.

Also, for evaluation of the magnetic head structure, a micromagnetic simulation was carried out in accordance with the Landau-Lifshiz-Gilbert (LLG) method which takes thermal fluctuation in magnetization into consideration and comparative analysis of output and noise of the magnetic head was made.

FIG. 1 is a schematic view showing an example of a magnetoresistive head structure according to an embodiment of the present invention. This magnetoresistive head is structured as follows. An anti-ferromagnetic film 5, a first ferromagnetic pinned layer 4, a pinned layer anti-parallel coupling layer 13, a second ferromagnetic pinned layer 3, a nonmagnetic interlayer 12, a second ferromagnetic layer 2, a free layer anti-parallel coupling layer 11, a first ferromagnetic layer 1 and an overcoat 6 are formed successively. Here, the second ferromagnetic layer 2 is larger than the first ferromagnetic layer 1 in terms of the product of film thickness and magnetization. The first ferromagnetic layer 1 and the second ferromagnetic layer 2 are coupled anti-ferromagnetically through the free layer anti-parallel coupling layer 11 and are set so that the magnetic field applied to the first ferromagnetic layer 1 by a coupling field is larger than the magnetic field applied to an end of the first ferromagnetic layer 1 in the track width direction by the bias layer 21. The first ferromagnetic layer 1, second ferromagnetic layer 2 and free layer anti-parallel coupling layer 11 are collectively called synthetic ferri free layer.

The first ferromagnetic layer 1 and second ferromagnetic layer 2 are multilayered films of CoFe alloy or NiFe alloy; however, instead, a single layer film of CoFeB alloy or CoMnGe heusler alloy, CoMnSi heusler alloy, CoCrAl heusler alloy, or CoFeAl alloy, or a multilayered film as combinations of these may be used. Although Cu is used for the nonmagnetic interlayer 12 to generate a giant magnetoresistive effect, Au or Ag or an alloy of these may be used instead. Alternatively alumina, titanium oxide or MgO may be used to generate a tunneling magnetoresistive effect. Although CoFe alloy is used for the second ferromagnetic pinned layer 3 and first ferromagnetic pinned layer 4, a single-layer film of NiFe alloy, CoFeB alloy, CoMnGe heusler alloy, CoMnSi heusler alloy, CoCrAl heusler alloy, or CoFeAl alloy, or a multilayered film as a combination of these may be used. The same material or different materials may be used for the second ferromagnetic pinned layer 3 and first ferromagnetic pinned layer 4.

For the pinned layer anti-parallel coupling layer 13, a material such as Ru, Ir, Cr, Rh, Re, Os, or Pt should be used with an adequately selected thickness to couple magnetization M3 of second ferromagnetic pinned layer and magnetization M4 of first ferromagnetic pinned layer anti-ferromagnetically. It is desirable that the magnitude of anti-ferromagnetic coupling be as strong as 1 kOe or more, namely 80 kA/m or more. The pinned layer anti-parallel coupling layer 13 has an effect of fixing magnetization M3 of second ferromagnetic pinned layer 3 with respect to the magnetic field to be sensed, by exchange coupling to make magnetization M4 of first ferromagnetic pinned layer 4 and magnetization M3 of second ferromagnetic pinned layer 3 anti-parallel to each other. Here, even when the first ferromagnetic pinned layer 4 is a single layer magnetic material or multilayered material (two or four layers or more), fall into the spirit of embodiments of the present invention.

The bias layer 21 is provided at both sides of the magnetoresistive effect layer in the track width direction. A nonmagnetic material 22 lies between the bias layer 21 and the second ferromagnetic layer 2. The bias layer 21 is made of CoPt alloy or CoPtCr alloy. The crystal structure of these alloys is usually a mixture of the face-centered cubic structure and hexagonal close-packed structure. The nonmagnetic material 22 is an insulating material if the magnetic head is of the current-perpendicular-to-the-plane type, or a conductive material if the magnetic head is of the current-in-to-the-plane type. As the insulating material, ordinary alumina or oxide silicon is used. As the conductive material, metal such as Cr or Cu is used.

A magnetic field from the bias layer 21 is applied to the first ferromagnetic layer 1 and second ferromagnetic layer 2. On the other hand, the first ferromagnetic layer 1 and second ferromagnetic layer 2 are anti-ferromagnetically coupled through the free layer anti-parallel coupling layer 11. The magnetic field generated by this anti-ferromagnetic coupling is called "coupling field." Here, since the product of film thickness and magnetization of the second ferromagnetic layer is larger than that of the first ferromagnetic layer 1, the direction of magnetization M2 of second ferromagnetic layer is the same as the direction of magnetization of the bias layer 21. In embodiments of the present invention, it is arranged that the magnetic field applied to the first ferromagnetic layer 1 by the coupling field is larger than the magnetic field applied at an end of the first ferromagnetic layer 1 in the track width direction from the bias layer 21, thereby keeping all magnetization M1 of first ferromagnetic layer anti-parallel to the magnetic field applied from the bias layer 21. Therefore, magnetization M1 of first ferromagnetic layer is oriented in the same direction and noise such as Barkhausen noise does not occur.

If the difference between magnetic head stripe height and track width is large, a shape magnetic anisotropy field is generated in the track width direction. In this case, it is arranged that the magnetic field applied to the first ferromagnetic layer 1 by the coupling field is larger than the sum of the magnetic field applied at an end of the first ferromagnetic layer 1 in the track width direction from the bias layer 21 and the shape magnetic anisotropy field in the track width direction, thereby enabling all magnetization M1 of first ferromagnetic layer to be kept anti-parallel to the bias field applied from the bias layer 21 and noise such as Barkhausen noise does not occur.

Figure 2:
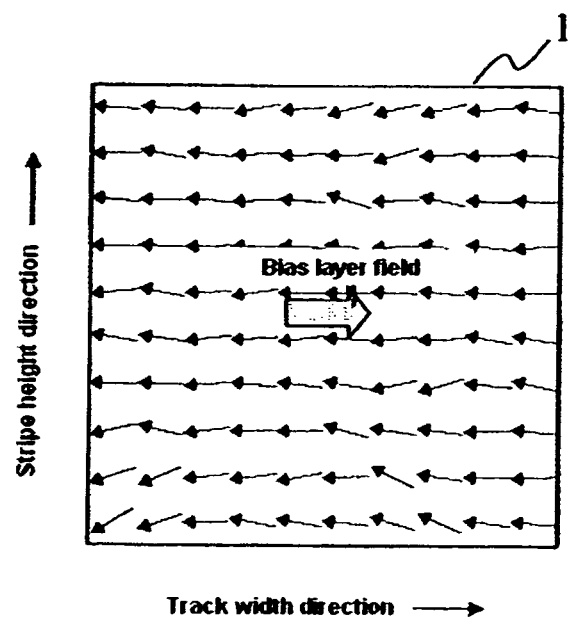
FIG. 2 is a graph showing a magnetization configuration of a first ferromagnetic layer according to an embodiment of the present invention.

FIG. 2 shows a result of computer simulation of the magnetization configuration of magnetization M1 of first ferromagnetic layer in the track width direction and stripe height direction as seen from a plane perpendicular to the film thickness direction in the condition that track width and stripe height are almost equal in the structure of embodiments of the present invention. It is found that microscopically the magnetization configuration of the first ferromagnetic layer is a single magnetic domain configuration in which particles are uniformly magnetized in one direction all over. This is because the coupling filed applied to the first ferromagnetic layer 1 from the second ferromagnetic layer 2 through the free layer anti-parallel coupling layer 11 is larger than the bias field applied from the bias layer 21 to the first ferromagnetic layer 1 all over, which is characteristic of the noise reduction effect achieved by the structure of embodiments of the invention.

Figure 3:
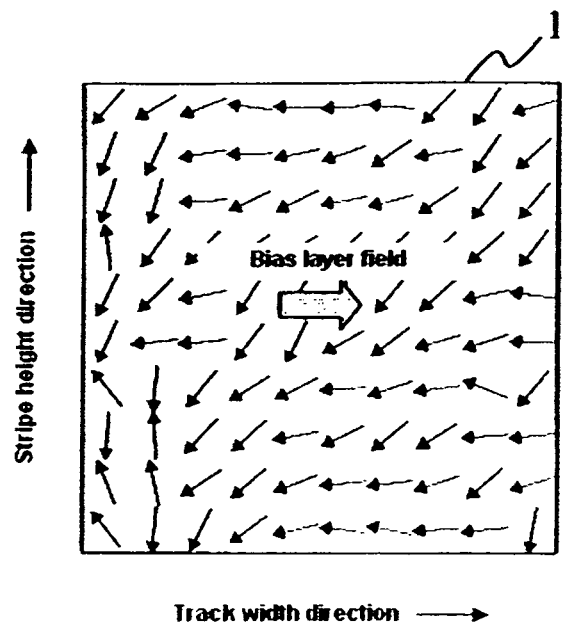
FIG. 3 is a graph showing a magnetization configuration of a conventional first ferromagnetic layer.

Similarly FIG. 3 shows the magnetization configuration of the first ferromagnetic layer in the conventional synthetic ferri free layer structure in the track width direction and stripe height direction as seen from a plane perpendicular to the film thickness direction. In the conventional structure, in magnetization M1 of first ferromagnetic layer, there are many particles with a large angle to the direction of the magnetic field applied from the bias layer 21. This tendency is particularly remarkable at the end in the track width direction. This is because the magnetic field applied from the bias layer 21 to the first ferromagnetic layer 1 is the largest at the end in the track width direction and this magnetic field is larger than the magnetic field applied to the first ferromagnetic layer 1 by the coupling field. This means that in the conventional structure, magnetization M1 of first ferromagnetic layer generates a magnetic domain which may cause noise.

Figure 4:
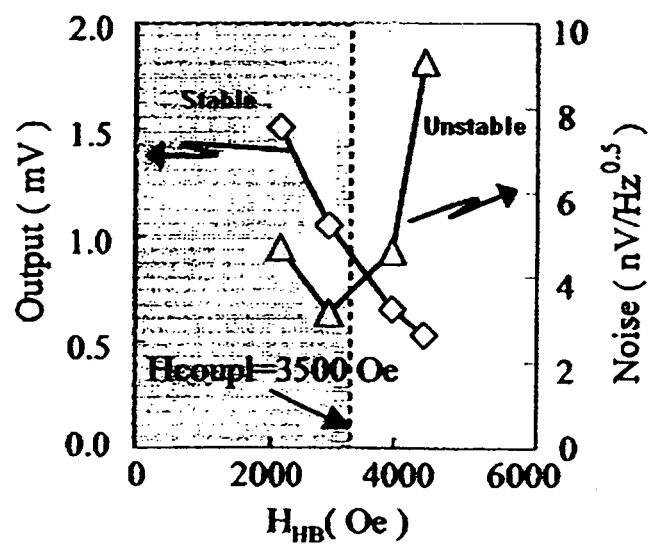
FIG. 4 is a graph showing the relation between reproduced output and noise, and the magnitude of the magnetic field applied at an end of the first ferromagnetic layer by a coupling field and the magnetic field applied from a bias layer.

FIG. 4 is a graph showing the relation among the magnetic field (HHB) applied from the bias layer 21 to an end of the first ferromagnetic layer 1 and reproduced output (Output) and noise. Here, the magnetic field applied to the first ferromagnetic layer 1 by the coupling field is approximately 3500 Oe (277.8 kA/m). The reproduced output decreases as the magnetic field applied from the bias layer 21 is larger. On the other hand, since mag-noise is proportional to the reproduced output, mag-noise should decrease as the magnetic field applied from the bias layer 21 is larger. On the contrary, noise increases as the magnetic field applied from the bias layer 21 is larger than the magnetic field applied by the coupling field. The reason for this is that when the coupling field of the synthetic ferri free layer is small, magnetization M1 of first ferromagnetic layer is tilted by the magnetic field from the bias layer 21 and a magnetic domain is generated in the first ferromagnetic layer 1, resulting in noise.

Figure 5:
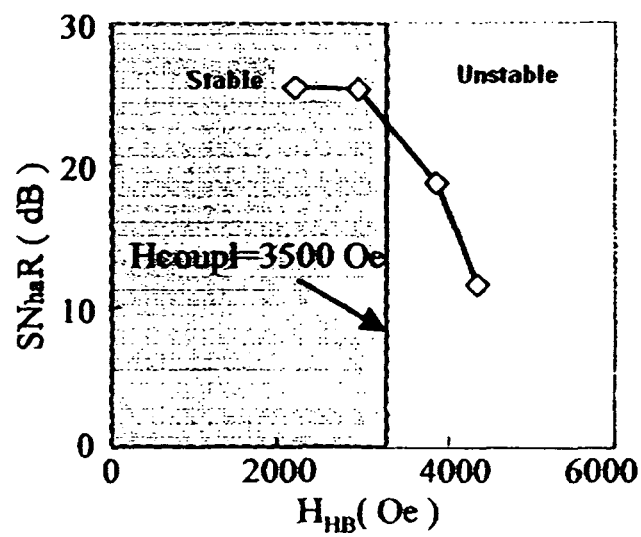
FIG. 5 is a graph showing the relation between head SNR and the magnitude of the magnetic field applied at an end of the first ferromagnetic layer by a coupling field and the magnetic field applied from a bias layer.

FIG. 5 shows the relation between the magnetic field applied from the bias layer 21 to an end of the first ferromagnetic layer 1 and head-amp SNR. When the magnetic field applied from the bias layer 21 to an end of the first ferromagnetic layer 1 in the track width direction is larger than the magnetic field applied by the coupling field, head-amp SNR deteriorates because of noise attributable to magnetic domain generation; however, by adopting a structure in which the magnetic field applied from the bias layer 21 to an end of the first ferromagnetic layer 1 in the track width direction is smaller than the magnetic field applied by the coupling field, noise characteristic of the synthetic ferri free layer can be reduced and deterioration in head-amp SNR can be prevented.

Figure 6:
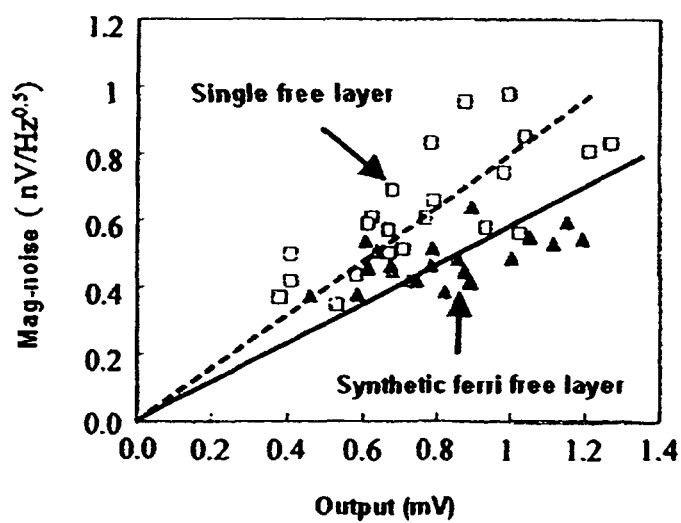
FIG. 6 is a graph showing the relation between mag-noise and reproduced output for a magnetic head using a synthetic ferri free layer and a magnetic head using a single free layer.
Figure 7:
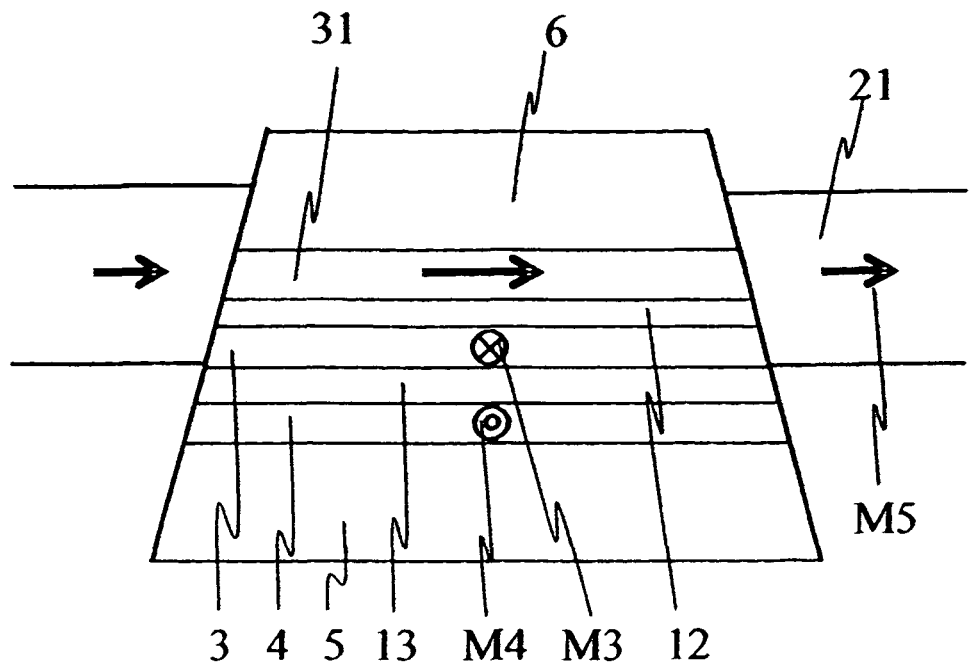
FIG. 7 is a view showing a structural example of a magnetic head using a single free layer.

FIG. 6 shows the relation between mag-noise and output in the magnetic head structure with a synthetic ferri free layer according to the present invention and the non-synthetic-ferri free magnetic head structure. Here the non-synthetic-ferri free magnetic head structure refers to a structure as illustrated in the schematic diagram of FIG. 7 in which a single ferromagnetic layer 31 is provided instead of the synthetic ferri free layer. Hereinafter the structure shown in FIG. 7 is called single free layer structure. In the experimental result shown in FIG. 6, the difference between the structure of embodiments of the invention and the single free layer structure exists only in the free layer structure. As apparent from FIG. 6, it has been found that at the same output, mag-noise is smaller in the invention structure than the single free layer structure. Mag-noise for the magnetic head with a synthetic ferri free layer is smaller than that for the magnetic head with a single free layer for the following reason. The two ferromagnetic free layers of the synthetic ferri free layer are magnetically coupled through the free layer anti-parallel coupling layer 11 and its effective free layer volume is considered to be larger than the volume of the single free layer 31. As apparent from Formula (1), mag-noise is inversely proportional to the square root of free layer volume and it is thus considered that the use of the synthetic ferri free layer brings about the effect of increasing the effective free layer volume, resulting in mag-noise reduction. In order to obtain this effect, it is preferable that the coupling field through the free layer anti-parallel coupling layer 11 for the first ferromagnetic layer 1 and second ferromagnetic layer 2 be 1 kOe (80 kA/m) or more. This is because the effective free layer volume does not increase unless the coupling field for the first ferromagnetic layer 1 and second ferromagnetic layer 2 is strong enough.

Figure 8:
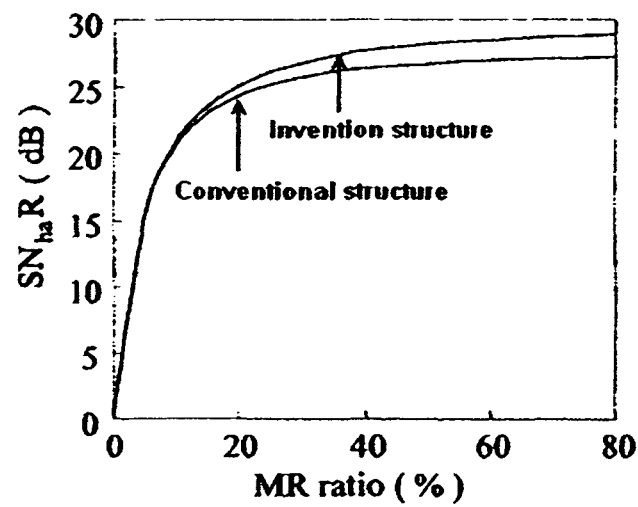
FIG. 8 is a graph showing the relation between head-amp SNR and MR ratio for the structure according to embodiments of the present invention and the conventional structure.

FIG. 8 shows the relation between head-amp SNR and MR ratio for the structure according to embodiments of the invention and the magnetic head using a single free layer. For both the structure according to embodiments of the invention and the single free layer structure, head-amp SNR reaches saturation as the MR ratio increases. The saturation of head-amp SNR is inevitable since mag-noise has the nature of being proportional to output. Besides, since mag-noise has the nature of being inversely proportional to the square root of free layer volume, the saturation value of head-amp SNR decreases when the hard disk drive recording density increases and the read head size is very small. Therefore, in order to increase the recording density of hard disk drives in the future, it is important to improve the saturation value of head-amp SNR. As shown in FIG. 8, the saturation value of head-amp SNR for the structure according to one embodiment is approximately 2 dB higher than that for the single free layer structure. In this structure, which employs a synthetic ferri free layer structure, head-amp SNR is improved by suppressing noise which is due to magnetic domain generation by the first ferromagnetic layer 1 and characteristic of the synthetic ferri free layer.

Next, a concrete example of the structure which ensures that the coupling filed for the synthetic ferri ferromagnetic free layer of the magnetoresistive head according to embodiments of the present invention is larger than the bias field at an end of the first ferromagnetic layer will be described.

As the method of controlling the magnetic field applied from the bias layer 21 to the first ferromagnetic layer 1, control of saturation magnetization by selection of the material of the bias layer 21 or control of the film thickness of the bias layer 21 is commonly used. However, since the saturation magnetization of the bias layer 21 depends on the material, it is very difficult to change the saturation magnetization freely. Also, there are problems with control of the film thickness of the bias layer 21 as follows: the recent need for a smaller track width and a smaller magnetic gap in magnetic heads must be met and thus there are limitations from the viewpoint of a magnetic head manufacture process and also since the magnetic property of the bias layer 21 must be kept adequate, it has been difficult to make an extremely thin or thick film. On the other hand, in the invention structure, the nonmagnetic material 22 is provided between the synthetic ferri free layer and the bias layer 21 and by controlling the film thickness of the nonmagnetic material 22, the magnetic field applied from the bias layer 21 to the first ferromagnetic layer 1 can be controlled with a higher degree of freedom than before. Furthermore, in the current-perpendicular-to-the-plane head, because of the need for prevention of short between the multilayered film and the bias film 21, an insulating material must be used for the nonmagnetic material 22. For prevention of electric short, preferably the nonmagnetic material should have a film thickness of 0.5 nm or more.

In order to make the magnetic field (Hcoup1) applied to the first ferromagnetic layer 1 by the coupling field in the magnetoresistive head larger than the sum of the bias field (HHB) at an end of the first ferromagnetic layer 1 and the shape magnetic anisotropy field ($H_{shape}$) in the track width direction, the following expression (a) must be satisfied:

$$H_{coup1} > H_{HB} + H_{shape} \quad (a).$$

Where $t_f$(nm) denotes film thickness of the first ferromagnetic layer 1, M (Gauss) denotes saturation magnetization, J (erg/cm$^2$) denotes exchange coupling energy of the first ferromagnetic layer 1 and second ferromagnetic layer 2, $B_r$(Oe) denotes magnetization of the bias layer 21, $t_r$ (=film thickness of the bias layer 21/thickness of the nonmagnetic material) denotes the ratio of the film thickness of the bias layer 21 and the thickness of the nonmagnetic material 22 (distance between the bias layer 21 and the first ferromagnetic layer 1 in the track width direction), $T_w$ denotes track width of the synthetic ferri free layer, and SH denotes stripe height.

The following relations are satisfied:

$$H_{coup1} = \frac{4\pi J}{M t_f} \times 10^7 \quad (b)$$

$$H_{HB} = 0.16 B_r t_r^{0.38} \quad (c)$$

$$H_{shape} = M \times \frac{2}{\pi} a\tan\left(\frac{tr \times SH}{T_w \sqrt{t\frac{2}{f} + T\frac{2}{w} + SH^2}}\right) \quad (d)$$

Figure 9:
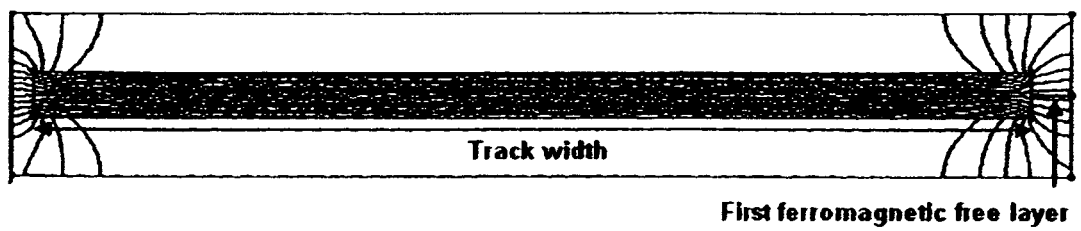
FIG. 9 is a view showing an example of bias field calculation by the finite element method.
Figure 10:
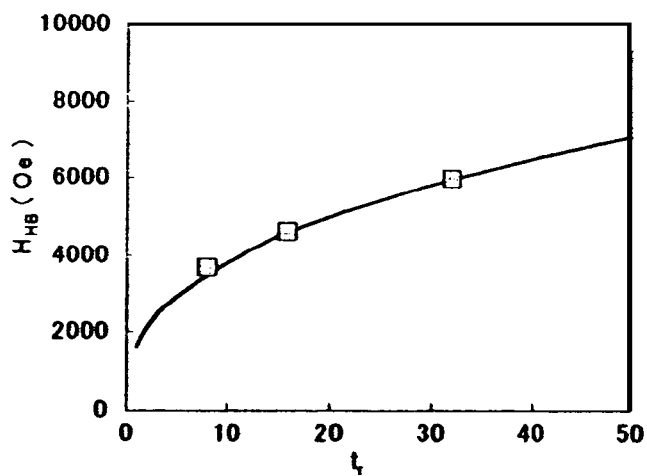
FIG. 10 is a graph showing the relation between the magnetic field applied from the bias layer to an end of the first ferromagnetic layer and the thickness ratio of the bias layer and nonmagnetic material.

Here, Expression (c) is an approximate expression derived from a bias field calculated by magnetic head field computation using the finite element method and Expression (d) is an approximate expression derived electromagnetically by magnetic head field computation. One example of bias field calculation by the finite element method is illustrated in FIG. 9. FIG. 9 shows distribution of magnetic fields by the bias layer in the magnetic head track width and stripe height directions. The magnetic head used in the calculation has a track width of 60 nm and the saturation magnetization of its first ferromagnetic layer 1 is 10000 Gauss and the thickness of its nonmagnetic material 22 is 5 nm. Obviously, approximate expression (c) well reproduces a result of detailed calculation by the finite element method. FIG. 10 is a graph showing the relation between the magnetic field applied from the bias layer 21 to an end of the first ferromagnetic layer 1 as calculated by the finite element method and Expression (c) and the thickness ratio of the nonmagnetic material between the bias layer 21 and the first ferromagnetic layer 1 for the magnetic head with 60 nm track width and 10000 Gauss saturation magnetization of the first ferromagnetic layer.

Figure 11:
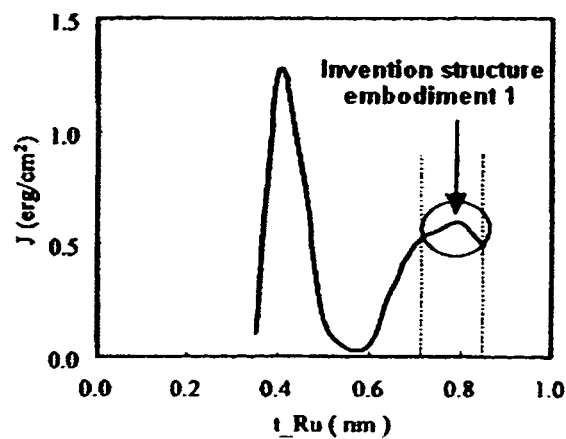
FIG. 11 is a graph showing the relation between exchange coupling energy and free layer anti-parallel coupling layer film thickness.

Here, in order to describe a more concrete structure or concrete data such as film thickness, typical structural attributes for the invention structure are substituted into Expressions (b), (c), and (d). The saturation magnetization of the first ferromagnetic layer 1 is 9000-11000 Gauss (0.9-1.1 T) and the saturation magnetization of the bias layer 21 is 10000-12000 Gauss (1.0-1.2 T). These values are obtained as a result of using, as typical magnetic head materials for the invention structure, NiFe alloy for the ferromagnetic free layer 1 and CoCrPt alloy thin film for the bias layer 21. For the free layer anti-parallel coupling layer 11, Ru is used as a material which is commonly used in magnetic heads. The exchange coupling energy of the free layer anti-parallel coupling layer 11 largely depends on Ru film thickness, t_Ru, as indicated in FIG. 11. For the purpose of satisfying Expression (a), it is better that the free layer anti-parallel coupling energy is larger. At the same time, for the sake of stability in the manufacture of a structure in which the film thickness is on the several nm order and the anti-parallel coupling energy changes, it is effective to use a region which has a peak in relation to thickness and is less dependent on thickness. In this sense, one option is to use the region with a second peak of free layer anti-parallel coupling energy in which the film thickness of the free layer anti-parallel coupling layer 11 is 0.70 nm or more and 0.85 nm or less. As shown in FIG. 11, the free layer anti-parallel coupling layer's exchange coupling energy in this region is approximately 0.55 erg/cm². Around the second peak in FIG. 11 (Ru film thickness is 0.70 nm or more and 0.85 nm or less), the free layer anti-parallel coupling energy varies with change in Ru film thickness more gradually than around the first peak in which Ru film thickness is 0.35 nm or more and 0.45 nm or less, and the second peak has a feature that a relatively high anti-parallel coupling energy is obtained relatively easily. Examples in FIGS. 13 to 16 as explained below are structural examples which use Ru thickness of 0.70 nm or more and 0.85 nm or less.

Figure 12:
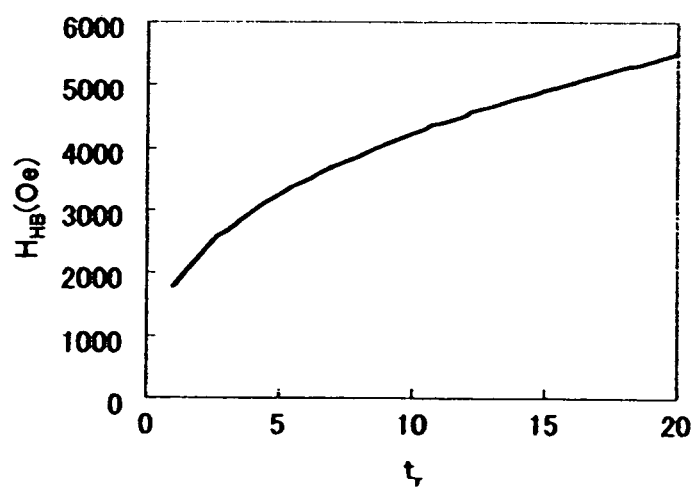
FIG. 12 is a graph showing the relation between the magnetic field applied from the bias layer to an end of the first ferromagnetic layer and the thickness ratio of the bias layer and nonmagnetic material.

The relation between the bias field (HHB) and the ratio of the film thickness of the bias layer 21 and the thickness of the nonmagnetic material 22, tr, (film thickness of the bias layer 21/thickness of the nonmagnetic material) is shown in FIG. 12. Similarly, FIG. 13 shows the relation between the magnetic field Hcoup1 applied to the first ferromagnetic layer 1 by anti-parallel coupling energy (0.55 erg/cm²) and the first ferromagnetic layer's film thickness $t_f$.

Figure 13:
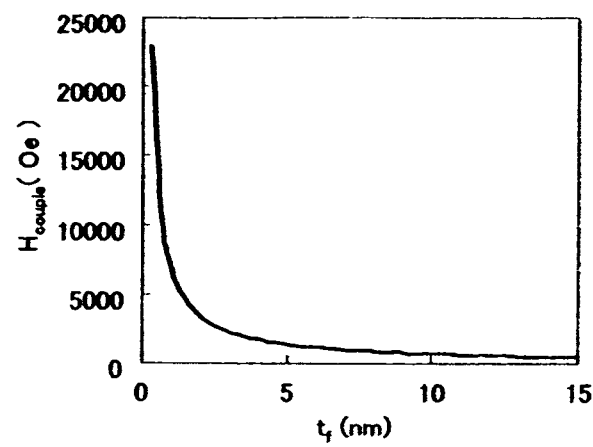
FIG. 13 is a graph showing the relating between exchange coupling energy and free layer anti-parallel coupling layer film thickness.

From FIGS. 12 and 13, the condition to satisfy Expression (a) for the ratio of the film thickness of the bias layer 21 and the thickness of the nonmagnetic material, $t_r$, and the first ferromagnetic layer's film thickness $t_f$ can be expressed by Expression (e).

$$t_f < 3.9 \times t_r^{-0.38} \quad (e)$$

Figure 14:
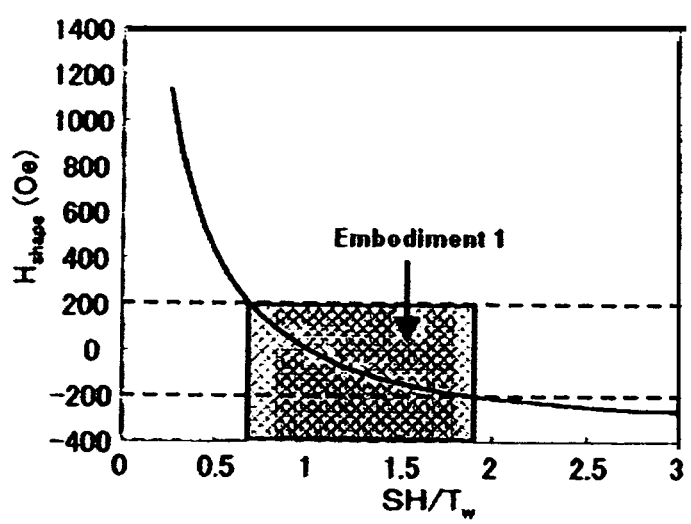
FIG. 14 is a graph showing the relation between shape magnetic anisotropy field in the track width direction and the ratio of track width and stripe height.

Expression (e) is derived by substituting Expressions (b) and (c) into Expression (a) and substituting 10000 Gauss for saturation magnetization M of first ferromagnetic layer 1, 11000 Gauss for saturation magnetization $B_r$ of bias layer 21 and 0.55 erg/cm² for exchange coupling energy J of the free layer anti-parallel coupling layer. FIG. 14 shows the relation between the shape magnetic anisotropy field ($H_{shape}$) in the track width direction with 4 nm film thickness of the first ferromagnetic layer 1 and 80 nm track width as expressed by Expression (d), and the ratio of stripe height and track width (stripe height/track width). In this embodiment, the ratio of stripe height (SH) and track width ($T_w$) is 0.7 or more and 2 or less. Here, the shape magnetic anisotropy field ($H_{shape}$) in Expression (a) is at most about one tenth of the bias field and negligible. Regarding the condition for the ratio of stripe height (SH) and track width ($T_w$) (stripe height/track width), since the bias field is approximately 2000 Oe or more as shown in FIG. 12, the shape magnetic anisotropy field can be −200 Oe or more and 200 Oe or less by making the ratio of magnetic head stripe height (SH) and track width ($T_w$) (stripe height/track width) 0.7 or more and 2 or less as shown in FIG. 14.

Figure 15:
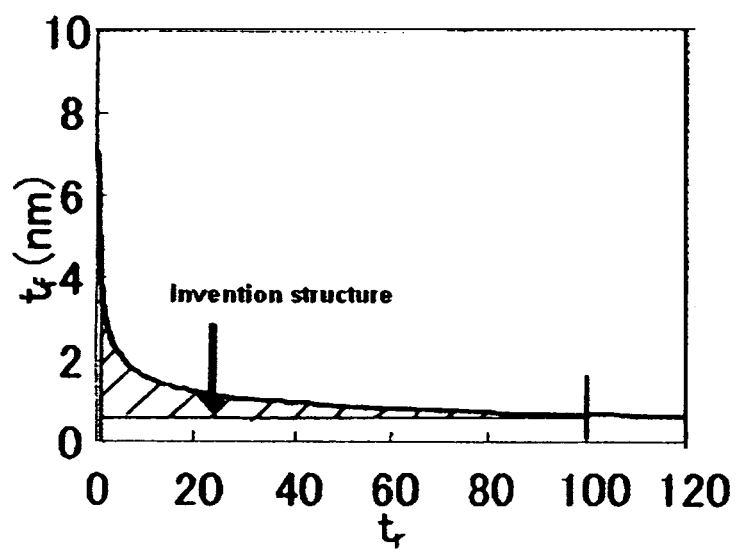
FIG. 15 is a graph showing the condition for the first ferromagnetic layer's film thickness $t_f$ and the ratio of the film thickness of the bias layer and the thickness of the nonmagnetic material, $t_r$.

The specific thicknesses of elements will be described in more detail. The film thickness of the bias layer 21 should be designed to be 10 nm or more and 50 nm or less. This is because in order to make the second ferromagnetic layer 2 a single-domain layer, it is magnetostatically necessary that the film thickness of the bias layer 21 is 1.5-2.0 times or larger than that of the second ferromagnetic layer 2. Since the second ferromagnetic layer of the synthetic ferri free layer is usually 5.0-7.0 nm at its maximum, it is desirable to design the film thickness of the bias layer 21 to be 10 nm or more. If the bias layer's film thickness is larger than 50 nm, the bias layer 21's magnetic coercivity would deteriorate and its remanent magnetization would decrease; therefore desirably the bias layer 21's thickness should be 50 nm or less. Another reason why the maximum thickness of the bias layer should be 50 nm is that in the liftoff process of removing excess parts from the bias layers 21 placed at both sides of the magnetoresistive effect layer, it might be difficult to peel the excess parts. Also the nonmagnetic material 22's thickness around the first ferromagnetic layer 1 must be 0.5 nm or more and 20 nm or less. The reason is that if the nonmagnetic material 22's thickness should be less than 0.5 nm, substantially a monoatomic layer level thickness, the nonmagnetic material 22 could not perform its function to magnetically separate the bias layer 21 and the first ferromagnetic layer 1. On the other hand, if the nonmagnetic material 22 should be extremely thick, the function that the bias field generated by the bias layer 21 makes the second ferromagnetic layer 2 a single-domain layer could not be performed. Hence, it is desirable that the nonmagnetic material 22's thickness be substantially 20 nm or less. Hence, it is desirable that the ratio of the film thickness of the bias layer 21 and the thickness of the nonmagnetic material 22, $t_r$, be 0.5 or more and 100 or less. Also, if the first ferromagnetic layer's thickness should be 0.5 nm or less, which is substantially a monoatomic layer level thickness, the function as magnetic thin film would be hardly performed satisfactorily; therefore, there is a lower limit. Therefore, the condition to satisfy Expression (e) for the first ferromagnetic layer's film thickness $t_f$ and the ratio of the film thickness of the bias layer 21 and the thickness of the nonmagnetic material 22, $t_r$, is as indicated in FIG. 15.

A concrete magnetic head structure which satisfies the above relation will be described next. From the viewpoints of demand for smaller magnetic head inter-shield distances and mag-noise reduction, it is desirable that the first ferromagnetic layer's film thickness $t_f$ be 0.5 mm or more and 4.0 mm or less. From FIG. 15, the first ferromagnetic layer's film thickness $t_f$ is 3.5 nm at its maximum. Therefore, in this structural example, the first ferromagnetic layer's film thickness $t_f$ is 0.5 nm or more and 3.5 nm or less. The range for the ratio of the bias layer 21's film thickness and the nonmagnetic material's thickness as shown in FIG. 15 which corresponds to the first ferromagnetic layer's film thickness $t_f$ is expected to be expressed by numerical data as accurately and concretely as possible. However, the range as the condition of this structure as shown in FIG. 15 is an exponential function and difficult to be defined simply as exact numerical values such as thickness data. Hence, the range as the condition of this structure is divided into three subranges given below. The thresholds for this division are set so as to broaden the condition of this structure as far as possible.

(1) a structure in which the first ferromagnetic layer's film thickness $t_f$ is 0.5 nm or more and 1.5 mm or less and the ratio of the bias layer 21's film thickness and the nonmagnetic material's thickness, $t_r$, is 0.5 or more and 15 or less.

(2) a structure in which the first ferromagnetic layer's film thickness $t_f$ is 1.5 nm or more and 2.5 mm or less and the ratio of the bias layer 21's film thickness and the nonmagnetic material's thickness, $t_r$, is 0.5 or more and 3.5 or less.

(3) a structure in which the first ferromagnetic layer's film thickness $t_f$ is 2.5 nm or more and 3.5 nm or less and the ratio of the bias layer 21's film thickness and the nonmagnetic material's thickness, $t_r$, is 0.5 or more and 1.2 or less.

Figure 16:
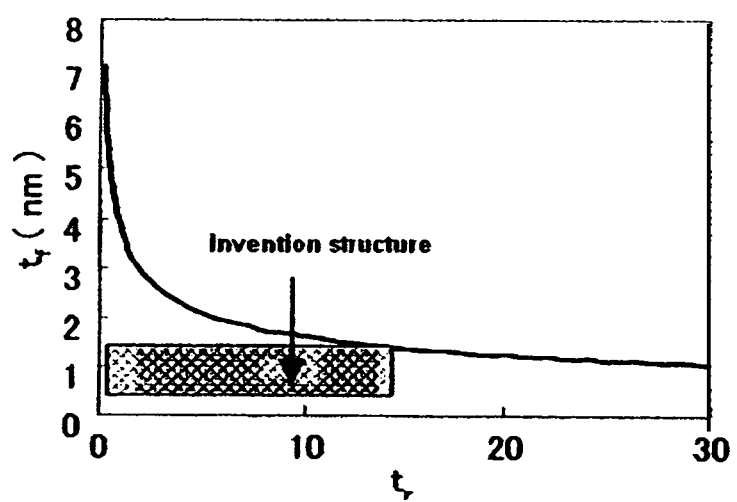
FIG. 16 is a graph showing the condition for $t_f$ and $t_r$.

In the case of the structure (1), a typical condition to satisfy Expression (a) for the ratio of the bias layer 21's film thickness and the nonmagnetic material's thickness, $t_r$, is shown in FIG. 16. A structural example is that the first ferromagnetic layer material is NiFe alloy and its film thickness is 1.0 nm and the second ferromagnetic layer material is an alloy of NiFe and CoFe and its film thickness is 3.0 nm. This structure can satisfy Expression (a) and noise due to the presence of a magnetic domain in the first ferromagnetic layer, which is characteristic of the synthetic ferri free layer, does not occur. When the first ferromagnetic layer thickness is very thin or 1.5 nm or less and the nonmagnetic material is thin, the tolerance for hard-bias layer film thickness can be wide.

However, this means that the nonmagnetic material must be very thin and accurately formed. As described above, according to this embodiment, it is possible to achieve the effect of increasing the volume of the synthetic ferri free layer while maintaining magnetic domain control properly and realize a read head with a high SNR even in a high recording density hard disk drive which uses a small sensor size.

Figure 17:
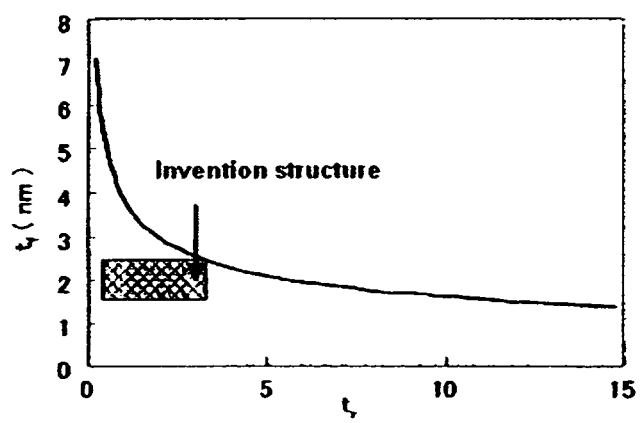
FIG. 17 is a graph showing the condition for $t_f$ and $t_r$.

In the case of the structure (2), typically the first ferromagnetic layer's film thickness is 1.5 nm or more and 2.5 nm or less and the ratio of the bias layer 21's film thickness and the nonmagnetic material's thickness, $t_r$, is in the range of 0.5-3.5. FIG. 17 shows the range within which this structure falls. In this structural example, the first ferromagnetic layer material is NiFe alloy and its film thickness is 2.0 nm and the second ferromagnetic layer material is an alloy of NiFe and CoFe and its film thickness is 4.0 nm.

Figure 18:
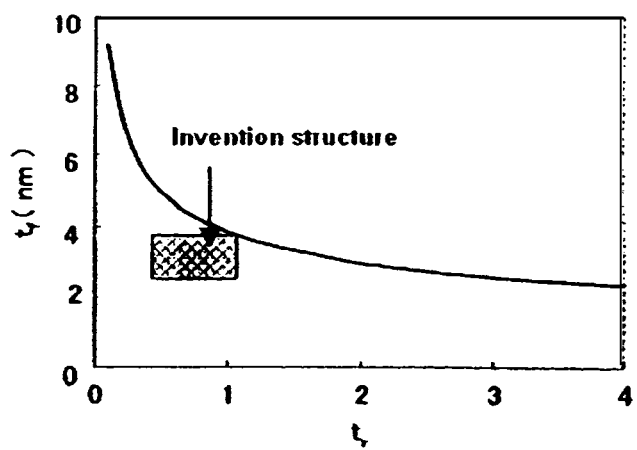
FIG. 18 is a graph showing the condition for $t_f$ and $t_r$.

In the case of the structure (3), typically the first ferromagnetic layer's film thickness is 2.5 nm or more and 3.5 nm or less and the ratio of the bias layer 21's film thickness and the nonmagnetic material's thickness, $t_r$, is in the range of 0.5-1.2 where a favorable magnetic domain control effect and a mag-noise reduction effect are achieved. FIG. 18 shows the range within which this structure falls. Here, the first ferromagnetic layer's thickness should preferably be 3.5 nm or less. As a typical example of the first and second ferromagnetic layers which fall within this, the first ferromagnetic layer is NiFe alloy with a film thickness of 3.0 nm and the second ferromagnetic layer is an alloy of NiFe and CoFe with a film thickness of 5.0 mm.

Figure 19:
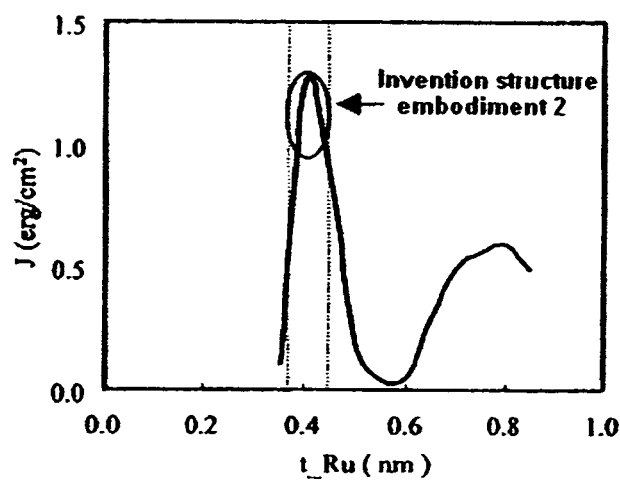
FIG. 19 is a graph showing the relating between exchange coupling energy and free layer anti-parallel coupling layer film thickness.

A second structural example of embodiments of the present invention will be described next. In this structural example, the film thickness of the free layer anti-parallel coupling layer 11 is 0.35 nm or more and 0.45 or less. This corresponds to the first peak for the free layer anti-parallel coupling layer 11's film thickness as shown in FIG. 19. The exchange coupling energy at this point is as large as 1.2 (erg/cm$^2$), which means that favorable magnetic domain control and mag-noise reduction can be achieved with a wider film thickness of the free layer anti-parallel coupling layer 11 than in embodiment 1. FIGS. 20 to 23, explained below, show structural examples in which the free layer anti-parallel coupling layer 11's thickness is 0.35 nm or more and 0.45 or less.

FIG. 19 shows the relation between exchange coupling energy and film thickness t_Ru of the free layer anti-parallel coupling layer 11. From FIG. 19, it is known that when the free layer anti-parallel coupling layer 11's thickness is 0.35 or more and 0.45 or less, the exchange coupling energy of the free layer anti-parallel coupling layer is 1.1-1.3 erg/cm$^2$ which is dramatically larger than when the free layer anti-parallel coupling layer's thickness is 0.70 nm or more and 0.85 or less. In other words, with this structure, the magnetic field ($H_{coup1}$) applied to the first ferromagnetic layer 1 by a coupling field can be larger than in embodiment 1.

According to the above parameters, the condition to satisfy Expression (a) for the ratio of the bias layer 21's film thickness and the nonmagnetic material's thickness, $t_r$, and the first ferromagnetic layer's film thickness $t_f$ can be expressed by Expression (f):

$$t_f < 8.6 \times t_r^{-0.38} \qquad (f)$$

Figure 20:
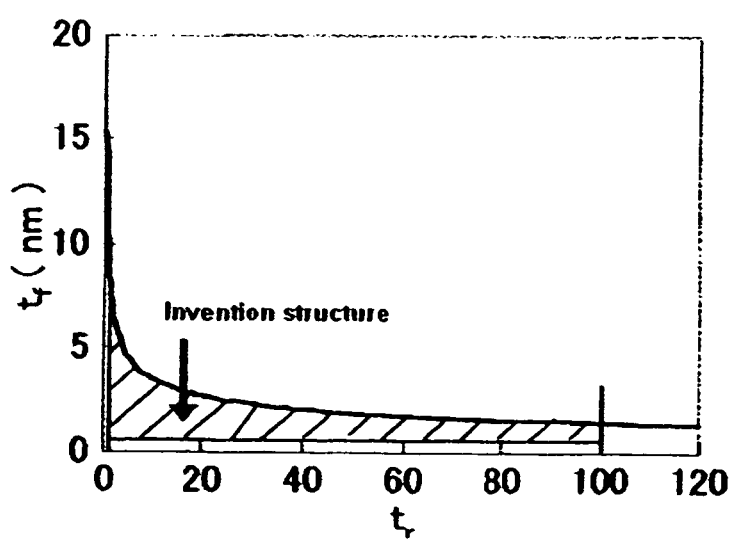
FIG. 20 is a graph showing the condition for $t_f$ and $t_r$.

Expression (f) is derived by substituting Expressions (b) and (c) into Expression (a) and substituting 10000 Gauss for saturation magnetization M of the first ferromagnetic layer 1, 11000 Gauss for saturation magnetization $B_r$ of the bias layer 21 and 1.2 erg/cm$^2$ for exchange coupling energy J of the free layer anti-parallel coupling layer energy. From Expression (f), it is known that the first ferromagnetic layer 1's film thickness can be larger and mag-noise can be more reduced than in embodiment 1. For the same reason as in embodiment 1, it is desirable that the first ferromagnetic layer film thickness $t_f$ be 0.5 nm or more and 4.0 m or less. Likewise, the ratio of the bias layer 21's film thickness and the nonmagnetic material 22's thickness, $t_r$, must be 0.5 or more and 100 or less. Therefore, the condition to satisfy Expression (f) for the first ferromagnetic layer's film thickness $t_f$ and the ratio of the bias layer 21's film thickness and the nonmagnetic material 22's thickness, $t_r$, is as indicated in FIG. 20. As in embodiment 1, in order to define the ranges for the first ferromagnetic layer's film thickness $t_f$ and the ratio of the bias layer 21's film thickness and the nonmagnetic material's thickness, $t_r$, by numerical values as accurately as possible, the range as the condition of this structure is divided into three subranges given below. The thresholds for this division are set so as to broaden the condition of this structure as far as possible.

(1) a structure in which the first ferromagnetic layer's film thickness $t_f$ is 3.0 nm or more and 4.0 nm or less and the ratio of the bias layer 21's film thickness and the nonmagnetic material's thickness, $t_r$, is 0.5 or more and 6 or less.

(2) a structure in which the first ferromagnetic layer's film thickness $t_f$ is 1.5 nm or more and 3.0 nm or less and the ratio of the bias layer 21's film thickness and the nonmagnetic material's thickness, $t_r$, is 0.5 or more and 20 or less.

(3) a structure in which the first ferromagnetic layer's film thickness $t_f$ is 0.5 nm or more and 1.5 nm or less and the ratio of the bias layer 21's film thickness and the nonmagnetic material's thickness, $t_r$, is 0.5 or more and 100 or less.

Figure 21:
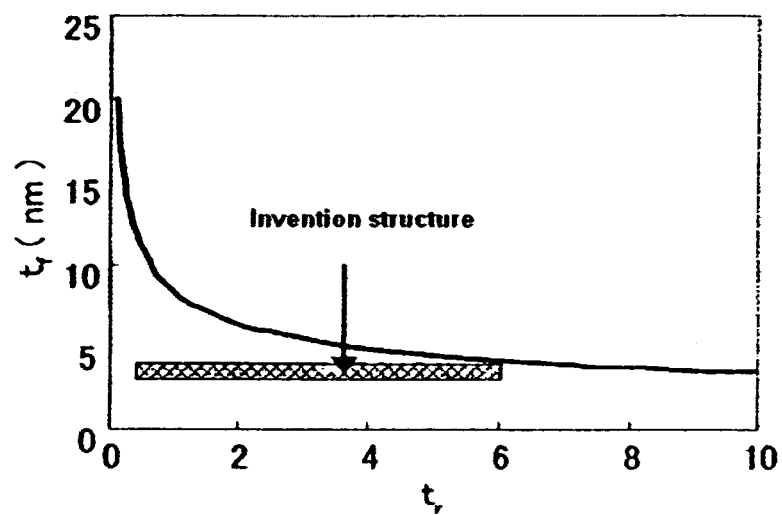
FIG. 21 is a graph showing the condition for $t_f$ and $t_r$.

FIG. 21 shows the condition to satisfy Expression (f) for the ratio of the bias layer 21's film thickness and the nonmagnetic material's thickness, $t_r$, where the first ferromagnetic layer's film thickness $t_f$ is 3.0 nm or more and 4.0 nm or less. As shown in the figure, when the ratio of the bias layer 21's film thickness and the nonmagnetic material's thickness, $t_r$, is 0.5 or more and 6 or less and the first ferromagnetic layer's film thickness $t_f$ is 0.5 nm or more and 4.0 nm or less, favorable magnetic domain control and mag-noise reduction can be achieved. This structural example can be realized when the first ferromagnetic layer 1 of the synthetic ferri free layer is NiFe with a film thickness of 3.5 nm and the second ferromagnetic layer 2's material is an alloy of NiFe and CoFe with a film thickness of 5.5 nm.

Figure 22:
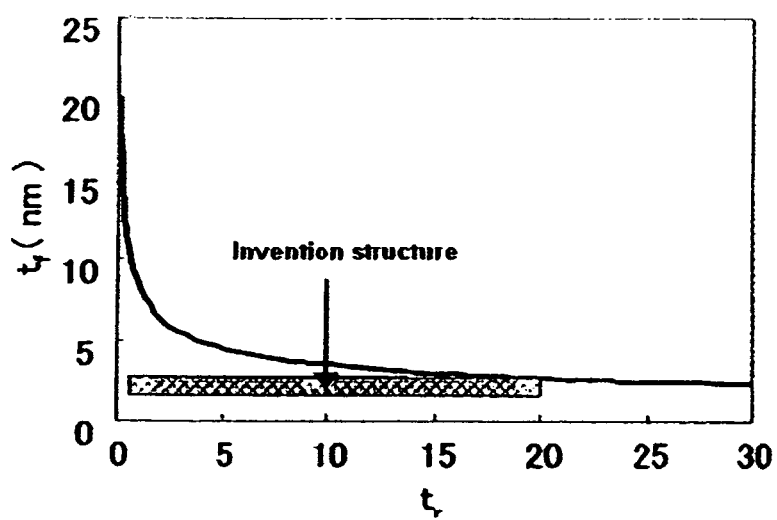
FIG. 22 is a graph showing the condition for $t_f$ and $t_r$.

FIG. 22 shows an example that when the ratio of the bias layer 21's film thickness and the nonmagnetic material's thickness is 0.5 or more and 20 or less and the first ferromagnetic layer's thickness is 1.5 nm or more and 3.0 nm or less, favorable magnetic domain control and mag-noise reduction are both achieved. An example of specific materials and thicknesses which satisfy this structural example is that the first ferromagnetic layer 1 is NiFe with a film thickness of 2.5 nm and the second ferromagnetic layer 2 is an alloy of NiFe and CoFe with a film thickness of 4.5 nm.

Figure 23:
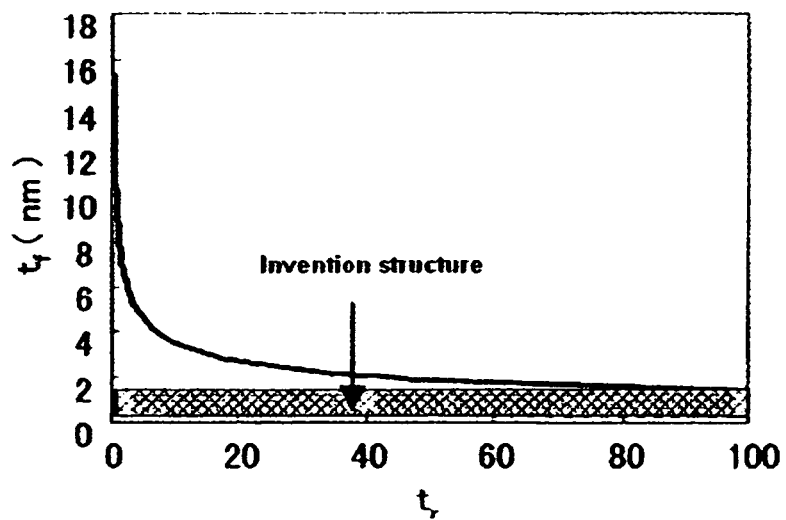
FIG. 23 is a graph showing the condition for $t_f$ and $t_r$.

As shown in FIG. 23, when the ratio of the bias layer 21's film thickness and the nonmagnetic material's thickness is 0.5 or more and 100 or less and the first ferromagnetic layer's thickness is 0.5 nm or more and 1.5 nm or less, favorable magnetic domain control and mag-noise reduction are achieved. A concrete example of a film structure which satisfies the range in FIG. 23 is that the first ferromagnetic layer 1 is NiFe with a film thickness of 1.0 nm and the second ferromagnetic layer 2 is an alloy of NiFe and CoFe with a film thickness of 3.0 nm.

Figure 24:
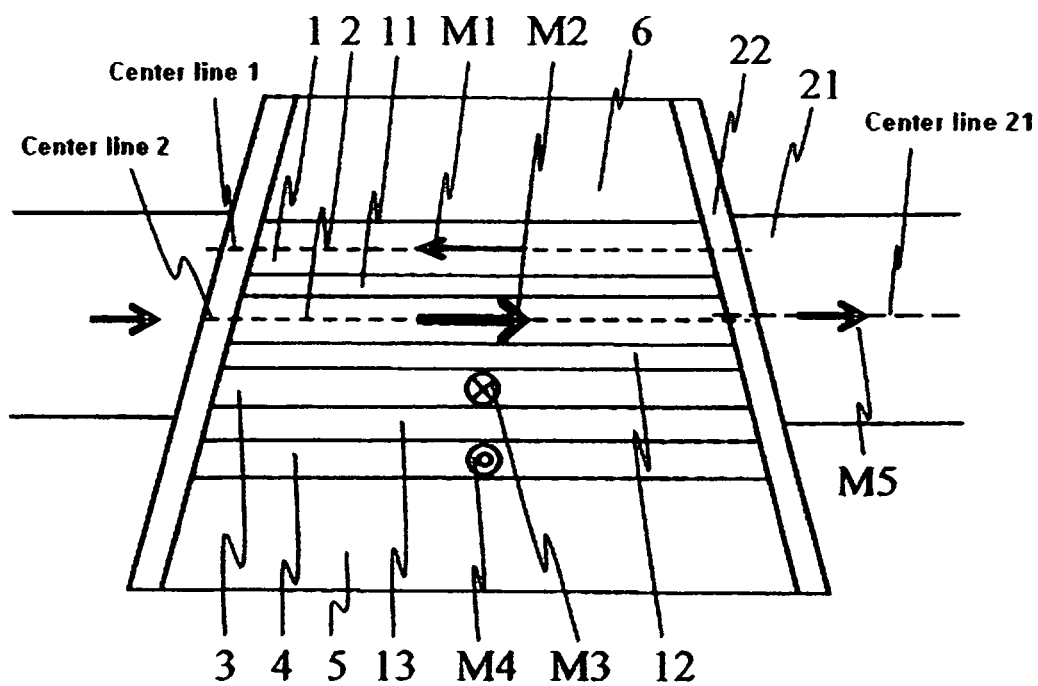
FIG. 24 is a view showing another structural example of the magnetoresistive head according to embodiments of the present invention.
Figure 25:
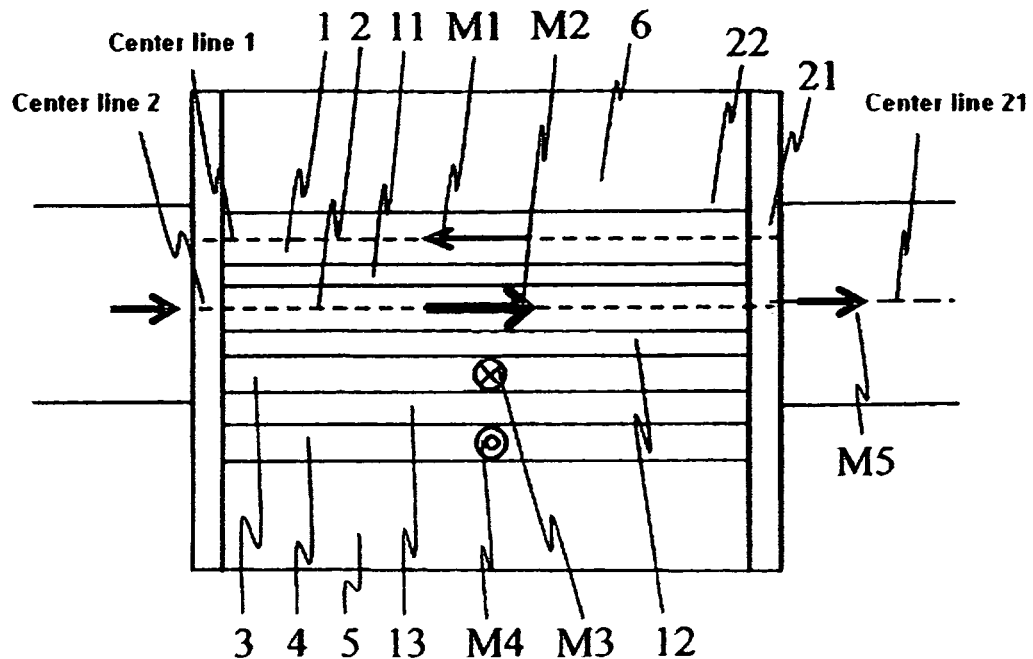
FIG. 25 is a view showing another structural example of the magnetoresistive head according to embodiments of the present invention.
Figure 26:
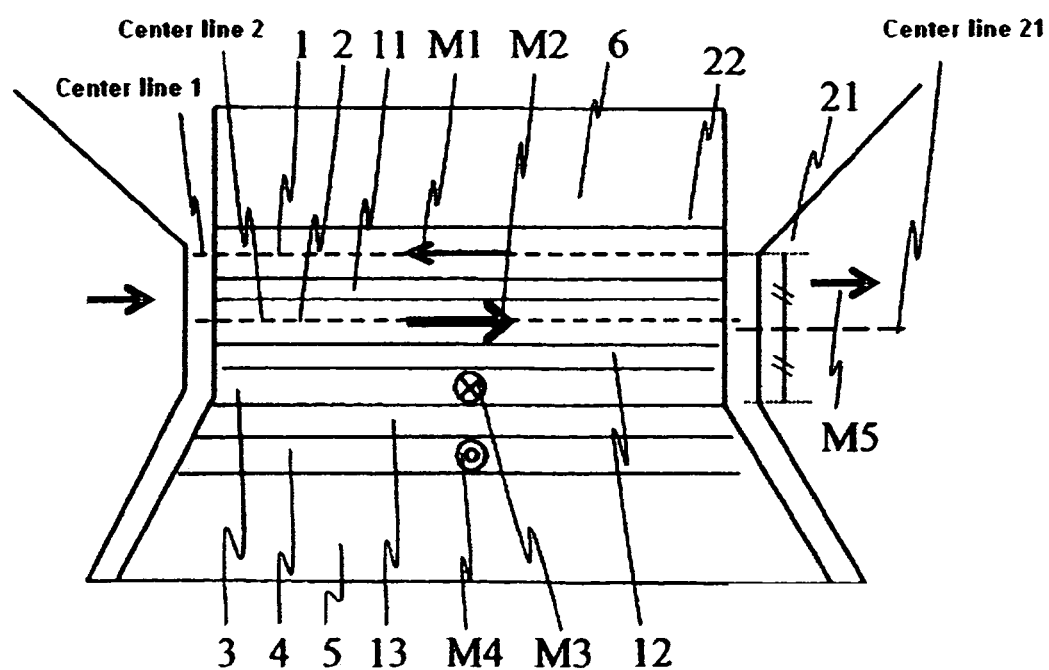
FIG. 26 is a view showing another structural example of the magnetoresistive head according to embodiments of the present invention.

A third structural example of embodiments of the present invention is shown in FIGS. 24, 25, and 26. In this structural example, the center of the bias layer 21 in the film thickness direction lies nearer to the center of the second ferromagnetic layer 2 than to the center of the first ferromagnetic layer 1. Here, the center of the bias layer 21 in the film thickness direction is defined as a point at which the plane nearest to the second ferromagnetic layer 2 is divided into equal parts. In this structure, the magnetic field applied from the bias layer 21 to the end of the first ferromagnetic layer 1 in the track width is smaller and the magnetic field from the bias layer 21 to the second ferromagnetic layer 2 is larger. Since the magnetic field applied from the bias layer 21 largely depends on distance from the bias layer 21, a more stable magnetic domain control structure can be realized by asymmetrical arrangement of the bias layer 21 where it is nearer to the second ferromagnetic layer than to the first ferromagnetic layer.

A magnetoresistive head with an air bearing surface shape as shown in FIG. 24 is an example that in the multilayered MR sensor over the substrate, a portion in a higher position has a smaller width in the track width direction. A magnetoresistive head with an air bearing surface shape as shown in FIG. 25 is an example that in the multilayered MR sensor over the substrate, the width in the track width direction is almost constant in the film thickness direction. A magnetoresistive head with an air bearing surface shape as shown in FIG. 26 is an example that the region adjacent to the substrate is trapezoidal where a portion in a higher position has a smaller width in the track width direction, while the width in the track width direction is almost constant above the region.

Figure 27:
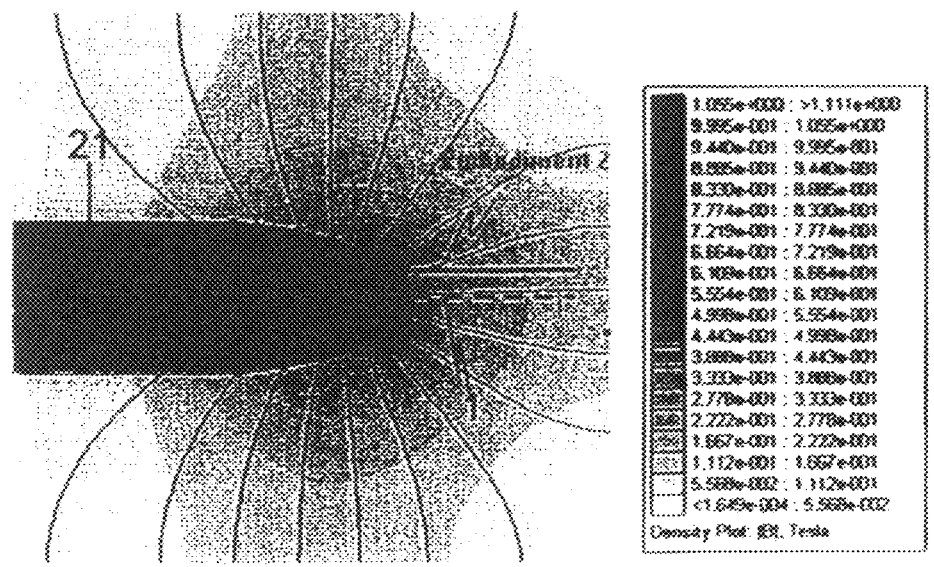
FIG. 27 is a view showing an example of bias field calculation by the finite element method.

In any example, the center of the first ferromagnetic layer 1 in the film thickness direction is on center line 1 shown in the figures and the center of the second ferromagnetic layer 2 in the film thickness direction is on center line 2. The center of the bias layer 21 in the film thickness direction is on center line 21. As shown in the figures, the center of the bias layer 21 in the film thickness direction lies near the center of the second ferromagnetic layer 2 in the film thickness direction and the magnetic field from the bias layer 21 is applied to the second ferromagnetic layer 2 more strongly than to the first ferromagnetic layer 1. An example of calculation of the bias field of the structure shown in FIG. 26 is shown in FIG. 27. As can be understood from FIG. 27, the bias field at the end in the track width is smaller in a structure where the center of the bias layer 21 in the film thickness direction lies nearer to the center of the second ferromagnetic layer 2 than to the center of the first ferromagnetic layer 1 in the film thickness direction, than in a structure where the center of the bias layer 21 in the film thickness direction coincides with the center of the first ferromagnetic layer 1 in the film thickness direction.

As discussed earlier, in order to suppress noise which occurs when magnetization M1 of first ferromagnetic layer 1 is tilted by the magnetic field applied from the bias layer 21, the bias field applied to the first ferromagnetic layer 1 must be smaller than the magnetic field applied to the first ferromagnetic layer by anti-ferromagnetic coupling of the first and second ferromagnetic layers. However, if the bias field is below a certain value, magnetic domain control of the second ferromagnetic layer would become impossible and the problem of nonlinear reproduced waveform or the like would arise. However, according to embodiment 3, suppression of the first ferromagnetic layer's noise characteristic of the synthetic ferri free layer and optimal magnetic domain control of the second ferromagnetic layer can be both achieved more reliably.

This structural example is an example that the shape magnetic anisotropy field ($H_{shape}$) is not negligible for a hard-bias field in embodiment 1. In this structural example, Expression (g) given below must be satisfied.

Formula 3

$$t_f < \frac{6900}{1800 \times t_r^{0.38} + Hshape} \quad (g)$$

Figure 28:
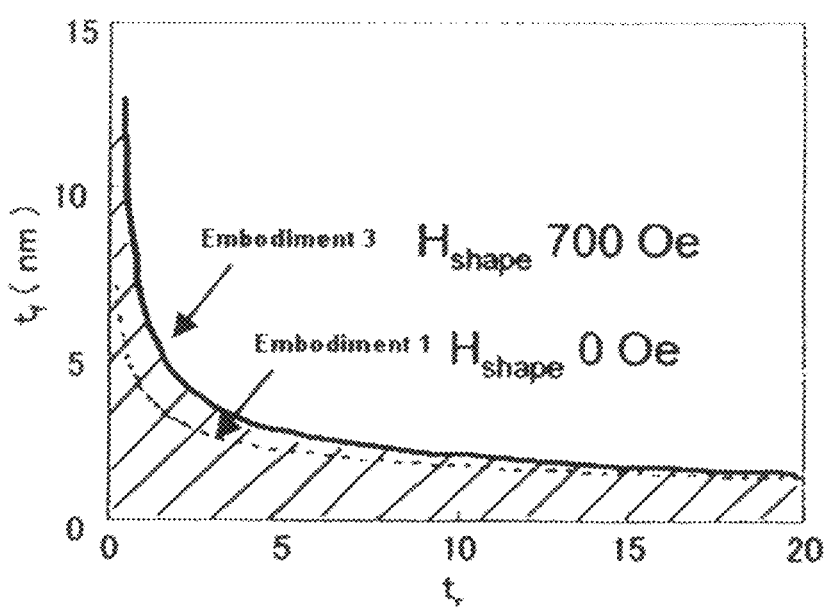
FIG. 28 is a graph showing the condition for $t_f$ and $t_r$.

Expression (g) is derived by substituting Expressions (b) and (c) into Expression (a) and substituting 11000 Gauss for saturation magnetization Br of the bias layer 21 and 0.55 erg/cm$^2$ for exchange coupling energy J of the free layer anti-parallel coupling layer. FIG. 28 shows an example of the invention structure. In this structural example, the track width of the synthetic ferri free layer is 80 nm and stripe height is 30 nm. The shape magnetic anisotropy field ($H_{shape}$) is known from FIG. 14 to be 700 Oe. In this structural example, due to the effect of the shape magnetic anisotropy field, the ratio of the bias layer 21's film thickness and the nonmagnetic material 22's thickness ($t_r$) and the first ferromagnetic layer's film thickness $t_f$ can be set to be larger than in embodiment 1. For example, when the first ferromagnetic layer's film thickness is between 1.5 nm and 2.5 nm, the ratio of the bias layer 21's film thickness and the nonmagnetic material 22's thickness ($t_r$) can be 0.5 or more and 7 or less.

Figure 29:
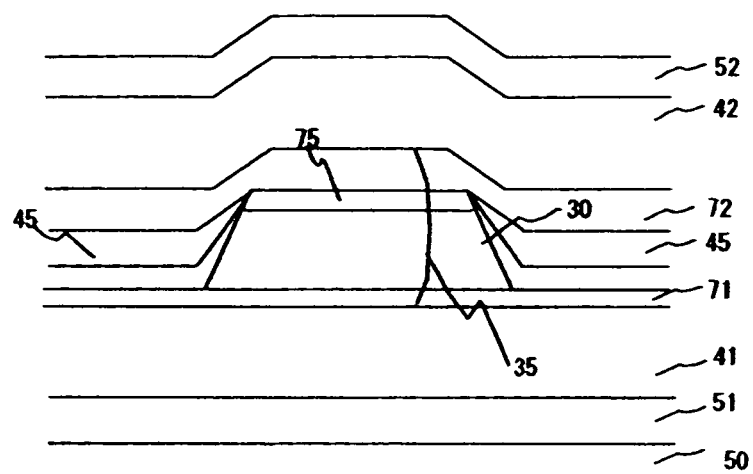
FIG. 29 is a view showing a structural example of the magnetoresistive head according to embodiments of the present invention.

FIG. 29 is a conceptual diagram of a current-perpendicular-to-the-plane magnetoresistive head with a magnetoresistive effect layer according to embodiments of the present invention and a view as seen from the opposed surface facing the magnetic medium. A second conductive electrode 51 is formed on a base substance 50 which also serves as a slider; a lower shield 41 is formed over it; a foundation layer 71, a magnetoresistive effect layer 30 and an overcoat 75 are successively formed over it; and further an upper shield foundation layer 72 and an upper magnetic shield 42 are formed to form a magnetic gap 35. A first conductive electrode 52 is formed over the upper magnetic shield 42. In order to stabilize operation of the magnetoresistive film 30, a pair of bias layers 45 of hard magnetic material are formed at both sides of the magnetoresistive effect layer 30. The foundation layer 71 contributes to improvement in the crystallinity, saturation-to-saturation resistance change ratio and soft magnetic property of the magnetoresistive effect layer 30 but may be omitted without departing from the spirit of the invention. The overcoat 75 contributes to improvement in corrosion resistance, etc. but may be omitted without departing from the spirit of the invention. The upper magnetic shield foundation layer 72 contributes to improvement in the soft magnetic property of the upper shield 42 but may be omitted without departing from the spirit of embodiments of the present invention. In the figure, the second conductive electrode and the lower magnetic shield are provided but the second conductive electrode 51 and the lower magnetic shield 41 may be combined. Similarly, the upper magnetic shield 42 may also serve as the first conductive electrode 52.

Figure 30:
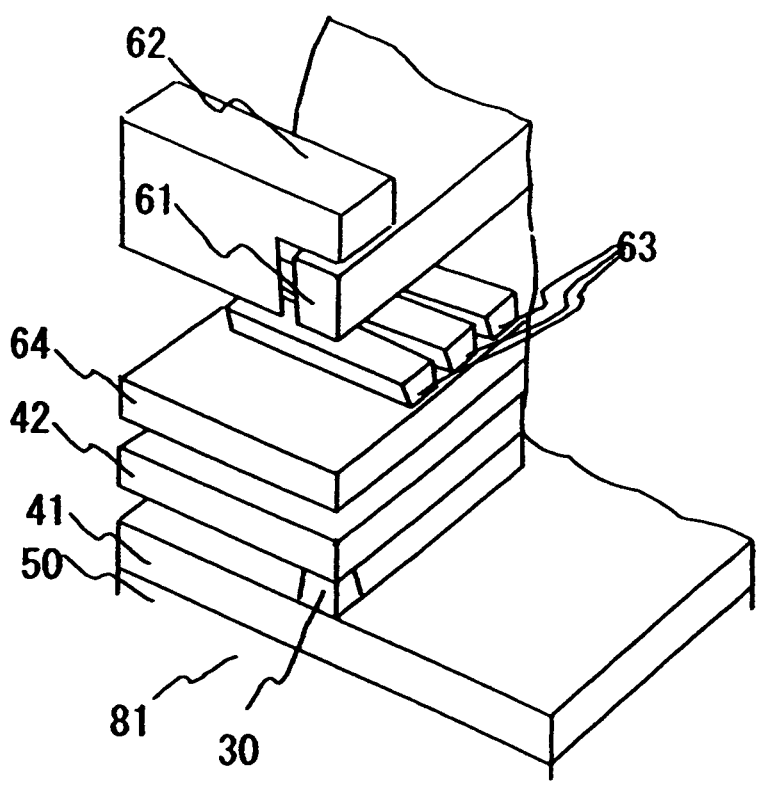
FIG. 30 is a view showing a structural example of a perpendicular recording write/read separation type magnetic head.

FIG. 30 is a conceptual diagram of a perpendicular magnetic recording system which uses a magnetic head with a magnetoresistive effect layer according to an embodiment of the present invention. Over a base substance 50 which also serves as a slider, a lower magnetic shield 41, a magnetoresistive effect layer 30, an upper magnetic shield 42, a return pole 64, coils 63, a main pole 61 and a wrap around shield 62 surrounding the main pole are formed, forming an opposed surface 81. In the figure, the upper magnetic shield and return pole are provided but the upper magnetic shield and return pole may be combined. The wrap around shield 62 may be omitted without departing from the spirit of embodiments of the present invention.

Figure 31:
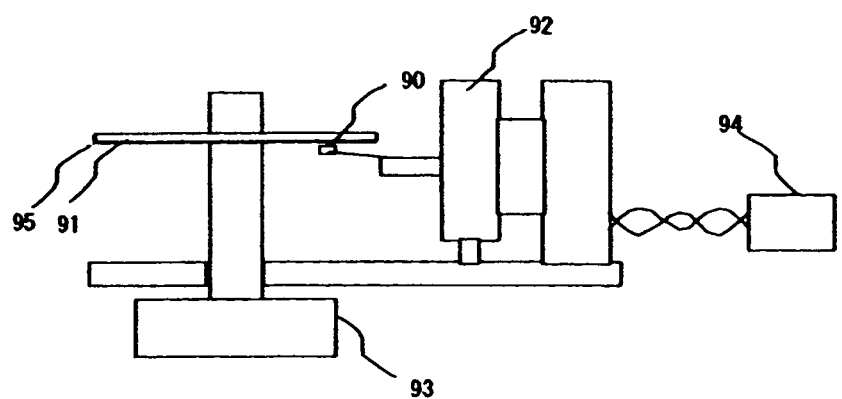
FIG. 31 is a view showing a structural example of a magnetic recording system.

FIG. 31 is a schematic diagram showing a structural example of a magnetic recording system which uses perpendicular magnetic recording. A disk 91 with a magnetic recording layer 95 for recording information magnetically is turned by a spindle motor 93 and an actuator 92 guides a head slider 90 to over tracks of the disk 91. A read head and a write head which are formed on the head slider 90 approach a specified recording position on the disk 91 and makes a relative movement by means of this mechanism and write and read signals successively. The actuator 92 should preferably be a rotary actuator. A recording signal is recorded on a medium by the write head through a signal processing circuit 94 and output of the read head is acquired as a signal through the signal processing circuit 94. When moving the read head to a desired recording track, a position on the track can be detected using high sensitivity output from the read head to control the actuator for positioning of the head slider. Although the figure shows one head slider 90 and one disk 91, two or more sliders or disks may be provided. Also the disk 91 may have a magnetic recording layer 95 on each side to record information. If information is recorded on both sides of the disk, head sliders 90 are provided for both sides of the disk.

As a result of a test conducted on a magnetic head according to embodiments of the present invention and a magnetic recording system with such magnetic head as described above, it has been demonstrated that mag-noise is reduced and head-amp SNR is improved.

The structure according to embodiments of the present invention can be applied to current-into-the-plane or current-perpendicular-to-the-plane magnetic sensors and magnetic heads which use a giant magnetoresistive effect called GMR, and tunneling magnetoresistive magnetic sensors and magnetic heads.

What is claimed is:

1. A magnetic head characterized by comprising:
    a ferromagnetic pinned layer;
    a ferromagnetic free layer;
    a nonmagnetic interlayer provided between the ferromagnetic pinned layer and the ferromagnetic free layer;
    bias layers provided at both sides of the ferromagnetic free layer in a track width direction such that an upper surface of the bias layers at ends thereof adjacent the ferromagnetic free layer are higher in a film thickness direction than an upper surface of the ferromagnetic free layer; wherein
    the ferromagnetic free layer has a synthetic ferri free structure in which a first ferromagnetic layer and a second ferromagnetic layer larger in product of magnetization and film thickness than the first ferromagnetic layer are magnetically anti-parallelly coupled through a free layer anti-parallel coupling layer;
    stripe height and track width, defined as widths in respective directions of the ferromagnetic free layer, are substantially equal in length; and
    a magnetic field applied to the first ferromagnetic layer by exchange coupling through the free layer anti-parallel coupling layer is larger than a bias field applied from the bias layer to an end of the first ferromagnetic layer in the track width direction.

2. The magnetic head as described in claim 1, characterized by having a CPP structure in which sense current is applied in a thin film thickness direction.

3. A magnetic head characterized by comprising:
    a ferromagnetic pinned layer;
    a ferromagnetic free layer;
    a nonmagnetic interlayer provided between the ferromagnetic pinned layer and the ferromagnetic free layer;
    bias layers provided at both sides of the ferromagnetic free layer in a track width direction such that an upper surface of the bias layers at ends thereof adjacent the ferromagnetic free layer are higher in a film thickness direction than an upper surface of the ferromagnetic free layer; wherein
    the ferromagnetic free layer has a synthetic ferri free structure in which a first ferromagnetic layer and a second ferromagnetic layer larger in product of magnetization and film thickness than the first ferromagnetic layer are magnetically anti-parallelly coupled through a free layer anti-parallel coupling layer;
    ratio of stripe height and track width is 0.7 or more and 2 or less; and
    a magnetic field applied to the first ferromagnetic layer by exchange coupling through the free layer anti-parallel coupling layer is larger than a bias field applied from the bias layer to an end of the first ferromagnetic layer in the track width direction.

4. The magnetic head as described in claim 3, wherein nonmagnetic material is provided between the second ferromagnetic layer,
    the bias layer, the free layer anti parallel coupling layer comprises Ru with a film thickness between 0.70 nm and 0.85 nm, and
    when the first ferromagnetic layer's film thickness is expressed by $t_f$(nm) and ratio of the bias layer's film thickness and the nonmagnetic material's thickness (bias layer film thickness/nonmagnetic material thickness) is expressed by $t_r$, $t_r$ is 0.5 or more and 100 or less and $t_r$ and $t_f$ satisfy the following relationship:

$$t_f < 3.9 \times t_r^{-0.38}.$$

5. A magnetic head characterized by comprising:
    a ferromagnetic pinned layer;
    a ferromagnetic free layer;
    a nonmagnetic interlayer provided between the ferromagnetic pinned layer and the ferromagnetic free layer;
    bias layers provided at both sides of the ferromagnetic free layer in a track width direction;
    wherein
    the ferromagnetic free layer has a synthetic ferri free structure in which a first ferromagnetic layer and a second ferromagnetic layer larger in product of magnetization and film thickness than the first ferromagnetic layer are magnetically anti-parallelly coupled through a free layer anti-parallel coupling layer; and
    a magnetic field applied to the first ferromagnetic layer by exchange coupling through the free layer anti-parallel coupling layer is larger than sum of bias field applied from the bias layer to an end of the first ferromagnetic layer in the track width direction and track width direction component of shape magnetic anisotropy field of the first ferromagnetic layer.

6. The magnetic head as described in claim 5, characterized by having a CPP structure in which sense current is applied in a thin film thickness direction.

7. The magnetic head as described in claim 5, characterized in that the upper surface of the bias layers at ends thereof adjacent the ferromagnetic free layer are higher in the film thickness direction than the upper surface of the ferromagnetic free layer.

8. The magnetic head as described in claim 5, wherein nonmagnetic material is provided between the second ferromagnetic layer, the bias layer, the free layer anti-parallel coupling layer comprises Ru with a film thickness between 0.70 nm and 0.85 nm, and when the first ferromagnetic layer's film thickness is expressed by $t_f$(nm) and ratio of the bias layer's film thickness and the nonmagnetic material's thickness (bias layer film thickness/nonmagnetic material thickness is expressed by $t_r$, $t_r$ is 0.5 or more and 100 or less and $t_r$ and $t_f$ satisfy the following relationship:

$$t_f < 3.9 \times t_r^{-0.38}.$$

9. A magnetic head characterized by comprising:
a ferromagnetic pinned layer;
a ferromagnetic free layer;
a nonmagnetic interlayer provided between the ferromagnetic pinned layer and the ferromagnetic free layer;
bias layers provided at both sides of the ferromagnetic free layer in a track width direction;
wherein
the ferromagnetic free layer has a synthetic ferri free structure in which a first ferromagnetic layer and a second ferromagnetic layer larger in product of magnetization and film thickness than the first ferromagnetic layer are magnetically anti-parallelly coupled through a free layer anti-parallel coupling layer;
a magnetic field applied to the first ferromagnetic layer by exchange coupling through the free layer anti-parallel coupling layer is larger than a bias field applied from the bias layer to an end of the first ferromagnetic layer in the track width direction; and
nonmagnetic material is provided between the second ferromagnetic layer and the bias layer.

10. The magnetic head as described in claim 9, characterized in that the center of an end of the bias layer adjacent to the ferromagnetic free layer is nearer to the second ferromagnetic layer than to the first ferromagnetic layer.

11. The magnetic head as described in claim 9, characterized in that the free layer anti-parallel coupling layer is made of Ru with a film thickness between 0.70 nm and 0.85 nm and when the first ferromagnetic layer's film thickness is expressed by $t_f$(nm) and ratio of the bias layer's film thickness and the nonmagnetic material's thickness (bias layer film thickness/nonmagnetic material thickness) is expressed by $t_r$, $t_r$ is 0.5 or more and 100 or less and $t_r$ and $t_f$ satisfy the following relation:

$$t_f < 3.9 \times t_r^{-0.38}.$$

12. The magnetic head as described in claim 9, characterized in that the free layer anti-parallel coupling layer is made of Ru with a film thickness between 0.70 nm and 0.85 nm and the first ferromagnetic layer's film thickness is 0.5 nm or more and 1.5 nm or less and ratio of the bias layer's film thickness and the nonmagnetic material's thickness (bias layer film thickness/nonmagnetic material thickness) is 0.5 or more and 15 or less.

13. The magnetic head as described in claim 9, characterized in that the free layer anti-parallel coupling layer is made of Ru with a film thickness between 0.70 nm and 0.85 nm and the first ferromagnetic layer's film thickness is 1.5 nm or more and 2.5 nm or less and ratio of the bias layer's film thickness and the nonmagnetic material's thickness (bias layer film thickness/nonmagnetic material thickness) is 0.5 or more and 3.5 or less.

14. The magnetic head as described in claim 9, characterized in that the free layer anti-parallel coupling layer is made of Ru with a film thickness between 0.70 nm and 0.85 nm and the first ferromagnetic layer's film thickness is 2.5 nm or more and 3.5 nm or less and ratio of the bias layer's film thickness and the nonmagnetic material's thickness (bias layer film thickness/nonmagnetic material thickness) is 0.5 or more and 1.2 or less.

15. The magnetic head as described in claim 9, characterized in that the free layer anti-parallel coupling layer is made of Ru with a film thickness between 0.35 nm and 0.45 nm and when the first ferromagnetic layer's film thickness is expressed by $t_f$(nm) and ratio of the bias layer's film thickness and the nonmagnetic material's thickness (bias layer film thickness/nonmagnetic material thickness) is expressed by $t_r$, $t_r$ is 0.5 or more and 100 or less and $t_r$ and $t_f$ satisfy the following relation:

$$t_f < 8.6 \times t_r^{-0.38}.$$

16. The magnetic head as described in claim 9, characterized in that the free layer anti-parallel coupling layer is made of Ru with a film thickness between 0.35 nm and 0.45 nm and the first ferromagnetic layer's film thickness is 3.0 nm or more and 4.0 nm or less and ratio of the bias layer's film thickness and the nonmagnetic material's thickness (bias layer film thickness/nonmagnetic material thickness) is 0.5 or more and 6 or less.

17. The magnetic head as described in claim 9, characterized in that the free layer anti-parallel coupling layer is made of Ru with a film thickness between 0.35 nm and 0.45 nm and the first ferromagnetic layer's film thickness is 1.5 nrn or more and 3.0 nm or less and ratio of the bias layer's film thickness and the nonmagnetic material's thickness (bias layer film thickness/nonmagnetic material thickness) is 0.5 or more and 20 or less.

18. The magnetic head as described in claim 9, characterized in that the free layer anti-parallel coupling layer is made of Ru with a film thickness between 0.35 nm and 0.45 nm and the first ferromagnetic layer's film thickness is 0.5 nm or more and 1.5 nm or less and ratio of the bias layer's film thickness and the nonmagnetic material's thickness (bias layer film thickness/nonmagnetic material thickness) is 0.5 or more and 100 or less.

19. The magnetic head as described in claim 9, characterized being a CPP structure in which sense current is applied in a thin film thickness direction.

20. The magnetic head as described in claim 9, characterized in that the upper surface of the bias layers at ends thereof adjacent the ferromagnetic free layer are higher in the film thickness direction than the upper surface of the ferromagnetic free layer.

* * * * *

UNITED STATES PATENT AND TRADEMARK OFFICE
CERTIFICATE OF CORRECTION

PATENT NO. : 9,245,548 B2
APPLICATION NO. : 12/011334
DATED : January 26, 2016
INVENTOR(S) : Shiimoto et al.

It is certified that error appears in the above-identified patent and that said Letters Patent is hereby corrected as shown below:

In the claims:

col. 20, line 36, replace "1.5 nrn" with --1.5 nm--.

Signed and Sealed this
Twenty-third Day of August, 2016

Michelle K. Lee
*Director of the United States Patent and Trademark Office*